US010614075B2

(12) United States Patent
Srinivasaraghavan

(10) Patent No.: US 10,614,075 B2
(45) Date of Patent: Apr. 7, 2020

(54) SYSTEMS AND METHODS FOR SCORING AND USING POPULARITY OF ENTITIES IN A MEDIA-CONTENT-BASED SOCIAL NETWORK TO PROVIDE A MEDIA SERVICE

(71) Applicant: Verizon Patent and Licensing Inc., Arlington, VA (US)

(72) Inventor: Haripriya Srinivasaraghavan, Plano, TX (US)

(73) Assignee: Verizon Patent and Licencing Inc., Basking Ridge, NJ (US)

( * ) Notice: Subject to any disclaimer, the term of this patent is extended or adjusted under 35 U.S.C. 154(b) by 1135 days.

(21) Appl. No.: 14/980,881

(22) Filed: Dec. 28, 2015

(65) Prior Publication Data
US 2017/0185598 A1 Jun. 29, 2017

(51) Int. Cl.
G06F 17/30 (2006.01)
G06F 16/2457 (2019.01)
G06F 16/40 (2019.01)

(52) U.S. Cl.
CPC ........ G06F 16/24578 (2019.01); G06F 16/40 (2019.01)

(58) Field of Classification Search
CPC .............................................. G06F 16/24578
USPC .................................. 707/748, 723
See application file for complete search history.

(56) References Cited

U.S. PATENT DOCUMENTS

| 8,402,031 | B2* | 3/2013 | Govani | G06F 16/951 707/748 |
| 8,762,326 | B1* | 6/2014 | Zhou | G06F 16/9535 707/609 |
| 8,909,652 | B2* | 12/2014 | Govani | G06F 16/951 707/748 |
| 2009/0182725 | A1* | 7/2009 | Govani | G06F 16/951 |
| 2013/0268482 | A1* | 10/2013 | Govani | G06F 16/951 707/609 |
| 2014/0222819 | A1* | 8/2014 | Dies | G06F 16/951 707/740 |

* cited by examiner

Primary Examiner — Baoquoc N To

(57) ABSTRACT

Systems and methods for scoring and using popularity of entities in a media-content-based social network to provide a media service are disclosed herein. An exemplary system assigns popularity scores to a plurality of entities included in a media-content-based social network, the popularity scores including a first popularity score assigned to a first entity included in the plurality of entities and a second popularity score assigned to a second entity included in the plurality of entities, detects an operation in the media-content-based social network, adjusts, in response to the detection of the operation in the media-content-based social network, the second popularity score of the second entity by an amount proportional to the first popularity score of the first entity at a time of the operation, and customizes a media service based at least in part on the popularity scores of the plurality of entities included in the media-content-based social network.

20 Claims, 18 Drawing Sheets

SYSTEMS AND METHODS FOR SCORING AND USING POPULARITY OF ENTITIES IN A MEDIA-CONTENT-BASED SOCIAL NETWORK TO PROVIDE A MEDIA SERVICE

BACKGROUND INFORMATION

Providers of media services seek to provide users of the media services with quality end-user experiences as the users interact with the media services to discover and consume media content. To this end, for example, providers of media services implement tools to help users conveniently discover and consume media content that is likely to be of interest to the users. While such tools have assisted users of media services, there remains room for new and/or improved media service systems and methods capable of providing users of media services with new and/or improved end-user experiences as the users interact with the media services.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Systems and methods for scoring and using popularity of entities in a media-content-based social network to provide a media service are described herein. As described herein, an exemplary system may score popularity of entities in a media-content-based social network and use the popularity scores of the entities in the media-content-based social network to customize a media service. Examples of ways that the exemplary system may score popularity of entities in a media-content-based social network and use the popularity scores of the entities in the media-content-based social network to customize a media service are described herein.

Various benefits may be realized in accordance with the methods and systems described herein. For example, methods and systems described herein may score popularity of entities in a media-content-based social network in one or more of the ways described herein to accurately represent realistic, relative popularities of the entities in the media-content-based social network. The popularity scoring may be performed in one or more ways, described herein, that protect from artificial, inaccurate inflation of popularity scores, from abuse by one or more savvy users (e.g., marketers) trying to "game the system," and/or from popularity scores becoming stale or outdated. Additionally or alternatively, the popularity scoring may be performed in one or more ways, described herein, that are efficient, support scalability, and/or conserve computing resources (e.g., processing and/or memory resources).

One or more of the ways of scoring popularity of entities in a media-content-based social network described herein may support new and/or improved ways of customizing a media service. For example, methods and systems described herein may use popularity scoring to customize a media service, such as by selecting certain media content to be tracked for users of the media service based on popularity scores, selecting certain media content to be represented in a media service user interface based on popularity scores, ordering or sorting representations of media content within a media service user interface based on popularity scores, and/or providing notifications about media content to users of the media service based on popularity scores. Such customizations of a media service based on popularity scoring may facilitate quality end-user experiences with the media service and/or may reduce the computing resources required to provide or interact with the media service (e.g., by tracking only media content that has at least a minimum threshold popularity score).

These and/or additional or alternative benefits that may be provided by exemplary methods and systems described herein will be made apparent by the following description.

Figure 1:
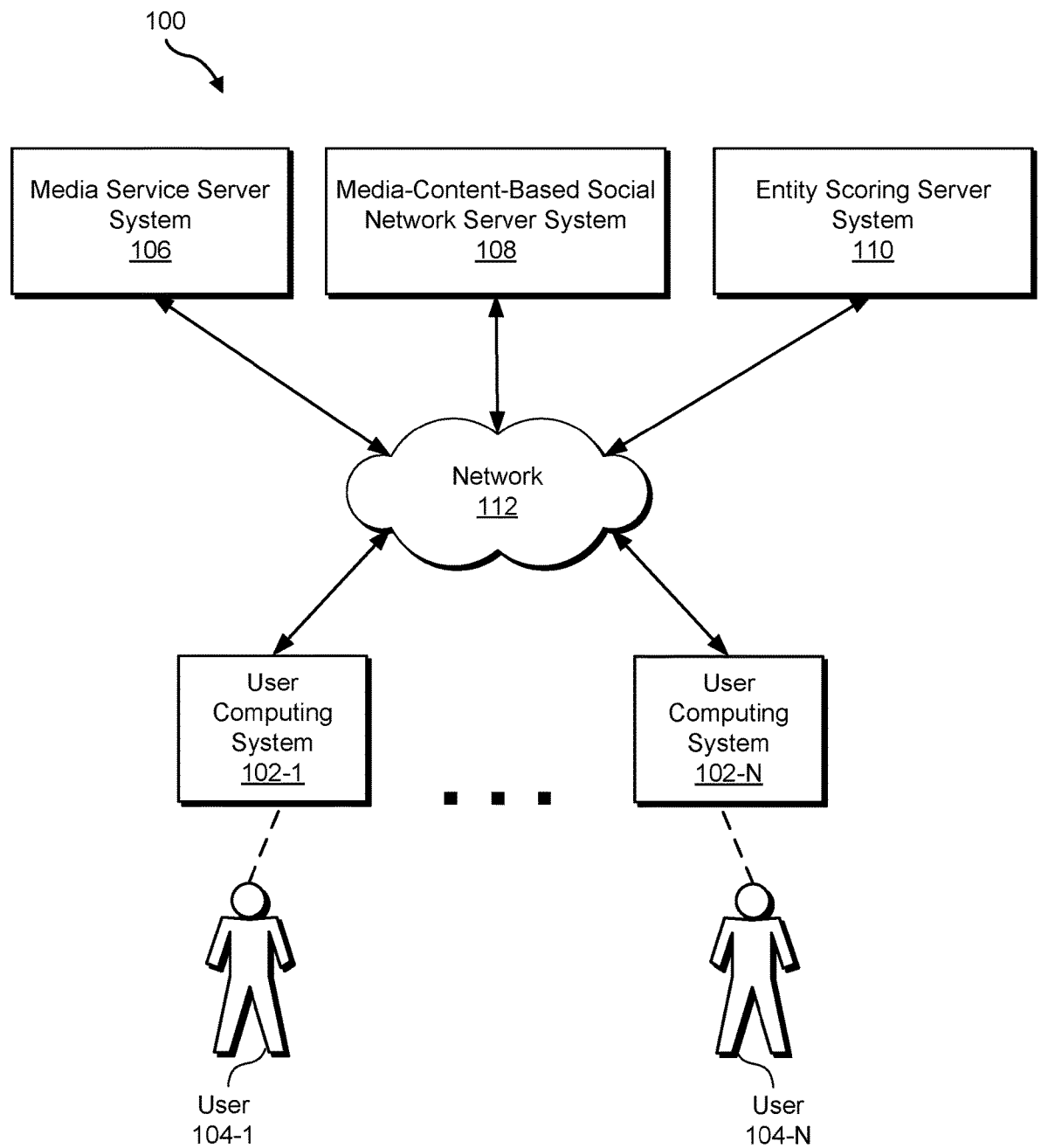
FIG. 1 illustrates an exemplary configuration in which popularity of entities in a media-content-based social network may be scored and used to provide a media service according to principles described herein.

FIG. 1 shows an exemplary configuration 100 in which popularity of entities in a media-content-based social network may be scored and used to provide a media service. As shown, configuration 100 may include user computing systems 102 (e.g., user computing systems 102-1 through 102-N) respectively associated with users 104 (e.g., users 104-1 through 104-N), which may be end users of a media service and/or a media-content-based social network provided in configuration 100. User computing systems 102 may be in communication with a media service server system 106, which may include one or more computing devices (e.g., server devices remotely located from user computing systems 102), a media-content-based social network server system 108, which may also include one or more computing devices (e.g., server devices located remotely from user computing systems 102), and an entity scoring server system 110, which may also include one or more computing devices (e.g., server devices located remotely from user computing systems 102).

User computing systems 102, media service server system 106, media-content-based social network server system 108, and entity scoring server system 110 may communicate using any communication platforms and technologies suitable for transporting data and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Markup Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

In certain embodiments, user computing systems 102, media service server system 106, media-content-based social network server system 108, and entity scoring server system 110 may communicate via a network 112. Network 112 may include one or more networks, such as one or more wireless networks (e.g., Wi-Fi networks), wireless communication networks, mobile telephone networks (e.g., cellular telephone networks), closed media networks, open media networks, wide area networks (e.g., the Internet), local area networks, and any other networks capable of carrying data (e.g., streaming and/or downloading media content) and/or communications signals between communication devices. Communications between any of user computing systems 102, media service server system 106, media-content-based social network server system 108, and entity scoring server system 110 may be transported using any one of the above-listed networks, or any combination or sub-combination of the above-listed networks. Alternatively, any of user computing systems 102, media service server system 106, media-content-based social network server system 108, and entity scoring server system 110 may communicate in another way such as by direct connections.

A user computing system 102 may be configured for use by a user 104 associated with (e.g., operating) the user computing system 102 to access a media service provided in configuration 100, such as a media service provided by media service server system 106. For example, the user computing system 102 may access and present one or more user interfaces provided as part of the media service for use by the user 104 to discover, access, and/or consume media programs distributed by media service server system 106 as part of the media service.

Additionally or alternatively, a user computing system 102 may be configured for use by a user 104 associated with (e.g., operating) the user computing system 102 to access a media-content-based social network provided in configuration 100, such as a media-content-based social network provided by media-content-based social network server system 108. For example, the user computing system 102 may access and present one or more user interfaces provided as part of the media-content-based social network for use by the user 104 to interact with and/or perform one or more operations with, on, and/or involving one or more entities included in the media-content-based social network provided by media-content-based social network server system 108.

A user computing system 102 may include one or more user computing devices associated with a user 104. Examples of such devices include, without limitation, a media player computing device, a display device, a set-top box device, a digital video recording ("DVR") device, a computer, a tablet computer, a smart phone device, and any other device capable of accessing the media service and/or media programs provided in configuration 100.

In certain examples, a user computing system 102 may include a first user computing device (e.g., a primary display device) configured to play back a media program and a second user computing device (e.g., a secondary or companion display device) configured to display a graphical user interface that may compliment or be used together with the playback of the media program by the first user computing device. For instance, a television may provide a primary display screen on which a video program may be displayed, and a tablet computer may provide a secondary display screen on which a graphical user interface (e.g., a graphical user interface related to the video program, the playback of the video program, the media service, and/or the media-content-based social network) may be displayed. Such an example is illustrative only. Other examples of a user computing system 102 may include any combination of user computing devices or a single user computing device configured to perform any of the user computing system and/or device operations described herein.

Media service server system 106 may provide a media service for access by users 104 through user computing systems 102. As part of the media service, media service server system 106 may distribute media programs to user computing systems 102 for access and use by user computing systems 102 to present media programs for consumption by users 104. Media service server system 106 may distribute media programs to user computing systems 102 using any suitable media streaming and/or downloading technologies (e.g., Internet media streaming and/or downloading technologies). In certain examples, the media service may include an online media streaming service such as an Internet streaming video service, and media service server system 106 may be configured to stream (e.g., unicast and/or multicast stream) media programs on-demand to user computing systems 102 by way of network 112. In other examples, the media service may additionally or alternatively include a linear programming service that distributes (e.g., broadcasts and/or multicasts) media programs according to a linear schedule, such as a digital cable, satellite, or Internet-based television service.

As used herein, the term "media content" may refer to any form of media that may be distributed through a media service and discovered, accessed, and/or consumed by a user of the media service including, but not limited to, visual, audio, audiovisual, and/or text-based media. Media content may include discrete instances of media, which may be referred to as media programs and/or media content items.

The term "media program" may refer to any television program, on-demand media program, pay-per-view media program, broadcast media program (e.g., broadcast television program), multicast media program (e.g., multicast television program), narrowcast media program (e.g., narrowcast video-on-demand program), IPTV media program, advertisement, video, movie, audio program, radio program, or any other media program that a user may access by way of the media service. Such media programs that are made available for user consumption through a media service may be accessed and/or played back by an appropriately configured user computing device (e.g., a media player device) for presentation to a user.

The term "media content item" may include a media program and/or another discrete instance of media, including, but not limited to, text-based media content, user-generated media content, and/or any other discrete instances of media that a user may generate and/or interact with by way of a media service or a media-content-based social network. Such media content items that are made available for user interaction through a media-content-based social network may be generated, accessed, and/or presented by an appropriately configured user computing device.

In certain examples, media service server system 106 may provide one or more media service user interfaces for access by user computing systems 102. The user interfaces may be configured for use by users 104 of user computing systems 102 to interact with the media service, including discovering and/or accessing media programs distributed by way of the media service. The user interfaces may include any of the exemplary user interface views described herein.

Media-content-based social network server system 108 may provide a media-content-based social network. As used herein, a media-content-based social network may include a defined group of entities and relationships between the entities, where at least a subset of the entities represent media content (e.g., media programs distributed by media service server system 106).

An entity in a media-content-based social network may represent a real-world and/or virtual object or person. For example, an entity may represent a user of the social network (also referred to as a "user entity" herein), a group of users, a media program, a group of media programs, a media content item, a group of media content items, a media profile (e.g., a fan page associated with a celebrity, a page associated with a television program, etc.), a person, object, or location associated with a media program (e.g., an actor or actress in a media program, a character in a media program, etc.), a comment regarding a real-world and/or virtual object or person represented by another entity, a share of a real-world and/or virtual object or person represented by another entity with one or more other entities in the media-content-based social network, and any other real-world and/or virtual object or person that may be represented as an entity in a media-content-based social network.

A relationship in a media-content-based social network may represent any specific association between entities in the media-content-based social network. Examples of such relationships may include, without limitation, a relationship indicating that one entity follows another entity, a relationship indicating that one entity has viewed another entity, a relationship indicating that one entity has created another entity, a relationship indicating that one entity has indicated interest (e.g., "liked") another entity, a relationship indicating that one entity has shared another entity with one or more other entities, and a relationship indicating that one entity has commented on another entity.

Media-content-based social network server system 108 may maintain data representative of a media-content-based social network. For example, media-content-based social network server system 108 may maintain data representative of entities included in the media-content-based social network and relationships between the entities. Media-content-based social network server system 108 may maintain data representative of a media-content-based social network in any suitable way and/or format.

Media-content-based social network server system 108 may perform one or more operations on one or more entities in the media-content-based social network. Such operations may be referred to as "social network operations" herein. To illustrate examples of social network operations, media-content-based social network server system 108 may perform a social network operation to add a new entity to the media-content-based social network (e.g., by creating a new entity in the media-content-based social network), a social network operation to indicate that one entity has indicated a preference for (e.g., "liked") another entity, a social network operation to indicate that one entity has viewed another entity, a social network operation to indicate that one entity has followed another entity, a social network operation to indicate that one entity has shared another entity, a social network operation to indicate that one entity has commented on another entity, a social network operation to indicate that one entity has unfollowed another entity, a social network operation to remove an entity from the media-content-based social network, a social network operation to discontinue and/or terminate any relationship between an entity and another entity, and any other social network operation that may be performed on an entity.

A social network operation may be directed from one entity in the media-content-based social network to one or more other entities in the media-content-based social network. An entity from which a social network operation is directed may be referred to as the subject of the social network operation, and an entity to which a social network operation is directed may be referred to as the target of the social network operation. For example, a social network operation may be directed from a first entity (a subject entity) to a second entity (a target entity). Performance of a social network operation directed from one entity to another entity may establish, modify, terminate, and/or reflect a relationship between the entities in the media-content-based social network.

Media-content-based social network server system 108 may perform one or more social network operations in response to user input associated with the media-content-based social network. For example, a user may interact with a user interface provided by media service server system 106 and/or media-content-based social network server system 108 to provide user input associated with the media-content-based social network. For instance, the user may provide user input requesting that a social network operation, such as a view, like, follow, share, comment, etc., be performed on an entity in the media-content-based social network. Media-content-based social network server system 108 may detect such user input and respond by performing the requested social network operation. In such examples, the social network operation may be said to be directed from a user entity representing or otherwise associated with the user to another entity in the media-content-based social network.

Entity scoring server system 110 may be configured to score entities within a media-content-based social network according to the principles described herein. In certain examples, entity scoring server system 110 may score entities within a media-content based social network by executing a state-based popularity scoring process to assign popularity scores to the entities based on a state of values of predetermined attributes of the entities at a time that the state-based popularity scoring process is executed. In certain other examples, entity scoring server system 110 may score entities within a media-content based social network by executing an operation-based popularity scoring process to dynamically assign or adjust popularity scores of the entities in response to detected social network operations between the entities. In certain other examples, entity scoring server system 110 may score entities within a media-content based social network using a combination of a state-based popularity scoring process and a dynamic, operation-based popularity scoring process. Operations that entity scoring server system 110 may perform to score entities within a media-content-based social network are described in detail herein.

Entity scoring server system 110 may provide data representative of popularity scores of entities within a media-content-based social network to media service server system 106 for use by media service server system 106 to customize a media service provided by media service server system 106. Media service server system 106 may customize the media service based at least in part on the popularity scores received from entity scoring server system 110. Examples of the media service being customized based at least in part on the popularity scores are described herein.

Figure 2:
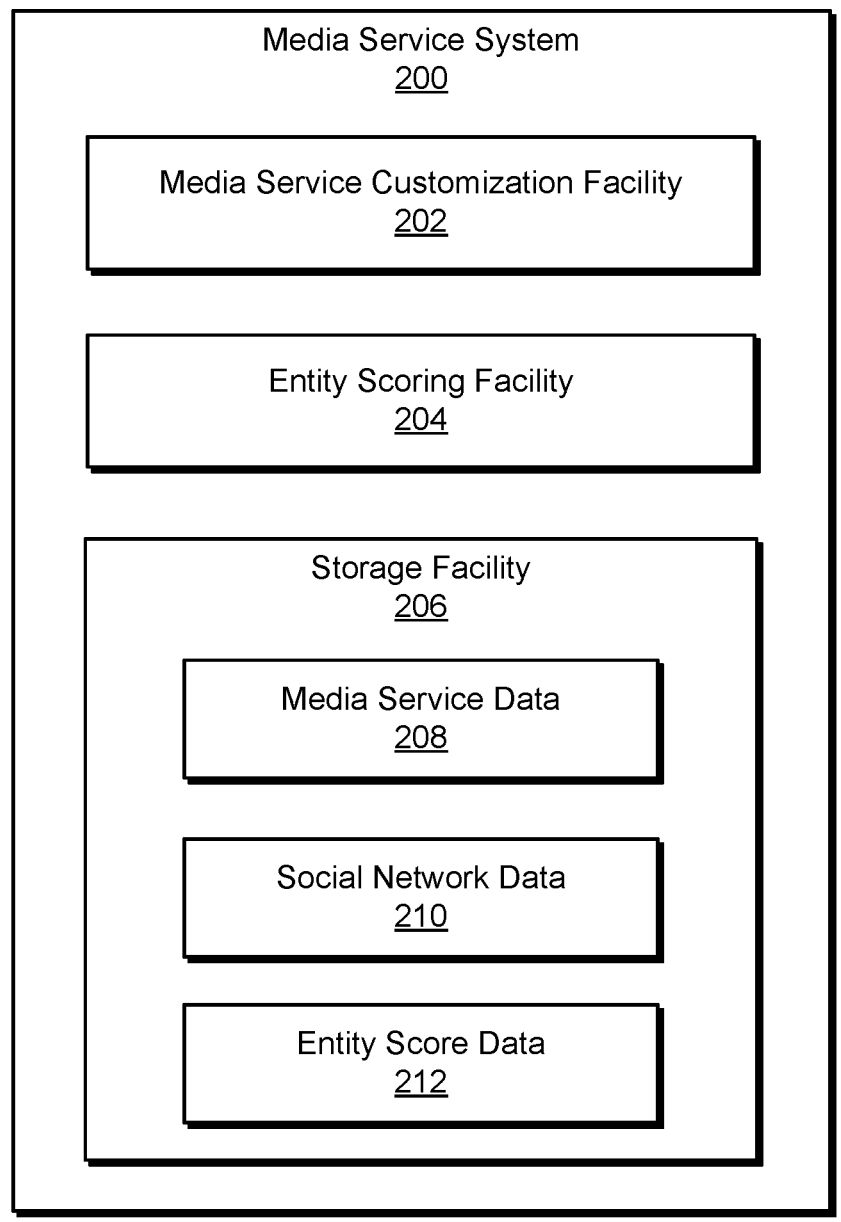
FIG. 2 illustrates an exemplary media service system configured to score and use popularity of entities in a media-content-based social network to provide a media service according to principles described herein.

FIG. 2 illustrates an exemplary media service system 200 ("system 200") configured to score and use popularity of entities in a media-content-based social network to provide a media service according to principles described herein. As shown in FIG. 2, system 200 may include, without limitation, a media service customization facility 202, an entity scoring facility 204, and a storage facility 206 selectively and communicatively coupled to one another. It will be recognized that although facilities 202-206 are shown to be separate facilities in FIG. 2, any of facilities 202-206 may be combined into fewer facilities, such as into a single facility, or divided into more facilities as may serve a particular implementation. Additionally or alternatively, one or more of the facilities 202-206 may be omitted from and external to system 200 in other implementations. For example, storage facility 206 may be external of and communicatively coupled to system 200 in certain alternative implementations. Additionally or alternatively, media service customization facility 202 may be external of and communicatively coupled to system 200 in other alternative implementations. Facilities 202-206 of system 200 may include or be otherwise implemented by one or more physical computing devices specifically configured to perform one or more of the operations described herein. In such implementations, system 200 may be referred to as a computer-implemented system 200.

One or more of facilities 202-206 of system 200 may be implemented in configuration 100 in any suitable way including, but not limited to, entirely by a user computing system 102, entirely by media service server system 106, entirely by media-content-based social network server system 108, entirely by entity scoring server system 110, or distributed across two or more of a user computing system 102, media service server system 106, media-content-based social network server system 108, and entity scoring server system 110 in any manner configured to facilitate media service system 200 scoring and using popularity of entities in a media-content-based social network to provide a media service.

Media service customization facility 202 may perform one or more functions to customize a media service based on popularity scores of entities in a media-content-based social network. For example, media service customization facility 202 may provide and/or customize a user interface for use by users of a media service to discover, select, view, rate, comment on, and/or otherwise interact with media content made available to the users by way of the media service and/or a media-content-based social network. Exemplary manners in which media service customization facility 202 may customize a media service will be described in additional detail below.

Entity scoring facility 204 may perform one or more operations to score popularity of entities in a media-content-based social network. Examples of entity scoring facility 204 scoring popularity of entities in a media-content-based social network are described in additional detail below.

Storage facility 206 may store data generated and/or used by media service customization facility 202 and/or entity scoring facility 204. For example, storage facility 206 may store media service data 208, social network data 210, and entity score data 212.

Media service data 208 may represent any information, content, and/or operations of a media service. For example, media service data may include data representative of media content that is discoverable and/or accessible through a media service and/or a media-content-based social network. Media service data 208 may represent actual content included in media content and/or information about the media content. For example, media service data 208 may include metadata (e.g., information about genre, cast, title, playback duration, release date, etc.) and/or enriched metadata (e.g., user-defined tags, ratings, etc.) for the media content. Additionally or alternatively, media service data 208 may include information, content, and/or other data that may be used or generated by media service customization facility 202 to customize a media service. For example, media service data 208 may include information regarding user interfaces that are customized or that may be customized by media service customization facility 202 in any of the ways described herein.

Social network data 210 may represent any information, content, and/or operations associated with a media-content-based social network. For example, social network data 210 may include information regarding entities and/or relationships between entities in the media-content-based social network. Examples of such information include, but are not limited to associations of users of the media-content-based social network with entities representing the users, entity relationships with other entities, types associated with entities (e.g., a user entity, a media content entity, etc.), media content and/or metadata associated with entities, comments associated with entities, shares or reshares associated with entities, time-to-live ("TTL") values associated with entities, decay factors associated with entities, operations performed by or on entities, and/or any other information regarding entities in the media-content-based social network as may serve a particular implementation. Examples of such information and how entity scoring facility 204 may use such information are described herein.

Entity score data 212 may represent popularity scores of one or more entities in a media-content-based social network. Entity scoring facility 204 may generate entity score data 212 and/or may use entity score data 212 in assigning and/or adjusting popularity scores of entities in a media-content-based social network as described herein. Media service customization facility 202 may use entity score data 212 to customize a media service as described herein. Storage facility 204 may store additional or alternative data as may serve a particular implementation.

Data stored by storage facility 206 may be accessed by system 200 from any suitable source, including a source internal or external to system 200. Storage facility 206 may permanently or temporarily store data. In certain examples, system 200 may access certain data from a source external to system 200 and temporarily store the data in storage facility 206 for use by media service customization facility 202 and/or entity scoring facility 204. In certain examples, data generated by media service customization facility 202 and/or entity scoring facility 206 may be stored permanently or temporarily to storage facility 206.

As mentioned, entity scoring facility 204 may score popularity of entities in a media-content-based social network, such as by executing a state-based popularity scoring process to assign popularity scores to the entities based on a state of values of predetermined attributes of the entities at a time that the state-based popularity scoring process is executed and/or by executing an operation-based popularity scoring process to dynamically assign or adjust popularity scores of the entities in response to detected social network operations between the entities. Examples of entity scoring facility 204 assigning popularity scores of entities as part of state-based and operation-based popularity scoring processes will now be described.

Entity scoring facility 204 may execute a state-based popularity scoring process at any suitable time to assign popularity scores to entities in a media-content-based social network based on a state of the media-content-based social network at the time that the state-based popularity scoring process is executed. In certain examples, entity scoring facility 204 may execute the state-based popularity scoring process in accordance with a predefined schedule, such as periodically as specified by the predefined schedule. For instance, entity scoring facility 204 may execute the state-based popularity scoring process daily, weekly, or monthly as specified by the predefined schedule.

As part of the state-based popularity scoring process, entity scoring facility 204 may assign popularity scores to a plurality of entities included in a media-content-based social network based on a state of values of predetermined attributes of the entities at a time that the state-based popularity scoring process is executed. In this or a similar manner, entity scoring facility 204 may assign popularity scores based on a snapshot of values of certain predetermined attributes of the entities at a particular time. Examples of such predetermined attributes of the entities may include, but are not limited to, a preassigned popularity score of each of the plurality of entities (e.g., a current or existing popularity score previously assigned to each of the entities before execution of the state-based popularity scoring process), an influence factor of each of the plurality of entities corresponding to a number of followers of each of the plurality of entities at the time the state-based popularity scoring process is executed, an activity factor of each of the plurality of entities corresponding to a number of operations involving each of the plurality of entities over a period of time preceding execution of the state-based popularity scoring process, a reach factor of each of the plurality of entities corresponding to a combination of a number of operations involving each of the plurality of entities over a period of time preceding execution of the state-based popularity scoring process and a number of followers of each of the plurality of entities, existing relationships between entities, any other suitable attribute, or any suitable combination or sub-combination of such attributes. In certain examples, the activity factor may be based on a cardinality of a set of operations involving each of the plurality of entities over a period of time since an execution of the state-based popularity scoring process immediately previous to the executing of the state-based scoring process and an age associated with each of the set of operations involving each of the plurality of entities over the period of time. In certain examples, the reach factor may be based on the cardinality of a set of operations involving each of the plurality of entities over a period of time and a number of followers of each of the plurality of entities.

To illustrate, suppose that, at a time of an execution of the state-based popularity scoring process, an entity that represents a television program has a preassigned popularity score of 1,000 popularity units, has 200 followers, and has been "liked" ten times since entity scoring facility 204 last executed the state-based popularity scoring process, wherein each "like" operation occurred less than twelve hours ago. Based on this state of the entity (i.e., the values of these attributes of the entity) at the time of the execution of the state-based popularity scoring process, entity scoring facility 204 may assign the entity that represents the television program a new popularity score of 1,200 popularity units based on the preassigned popularity score of the entity, the number of followers of the entity, and/or the number of "likes" of the entity. Entity scoring facility 204 may similarly apply the state-based popularity scoring process to other entities in the media-content-based social network based on the current states of those entities.

Entity scoring facility 204 may execute an operation-based popularity scoring process to dynamically assign and/or adjust popularity scores of one or more entities in a media-content-based social network in response to detected social network operations in the media-content-based social network. To this end, entity scoring facility 204 may detect a social network operation in a media-content-based social network in any suitable way. For example, entity scoring facility 204 may receive a communication from media-content-based social network server system 108 indicating that a social network operation has occurred in the media-content-based social network. As another example, entity scoring facility 204 may access, from storage facility 206 or from media-content-based social network server system 108 (e.g., by way of an application program interface), social network data 210 that indicates that a social network operation has occurred in the media-content-based social network. The detected social network operation may include, but is not limited to, any of the exemplary social network operations described herein. Examples of operations that may be performed by entity scoring facility 204 as part of an operation-based popularity scoring process will now be described.

In some examples, entity scoring facility 204 may detect a social network operation that indicates that an entity has been added to (e.g., created in) the media-content-based social network. In response, entity scoring facility 204 may assign a starting popularity score to the entity. Entity scoring facility 204 may determine the starting popularity score to assign to the entity in any suitable way. For example, entity scoring facility 204 may be configured to assign a predefined starting popularity score to any entity that is newly added to the media-content-based social network. As another example, entity scoring facility 204 may be configured to determine and assign a specific starting popularity score to a newly added entity based on a type of the entity. For instance, entity scoring facility 204 may assign a specific starting popularity score to an entity that represents a media content item (e.g., a user comment) and may assign a different specific starting popularity score to another entity that represents a new user.

A starting popularity score assigned to a newly added entity may be used by entity scoring facility 204 to determine a new, adjusted popularity score for the entity. For example, entity scoring facility 204 may use the starting popularity score of the newly added entity as the existing popularity score of the entity when determining how to adjust the popularity score of the entity in any of the ways described herein.

In certain examples, a social network operation may be between two entities in a media-content-based social network. Entity scoring facility 204 may detect such an operation and, in response, may adjust the popularity score of either or both of the entities involved in the social network operation.

Figure 3:
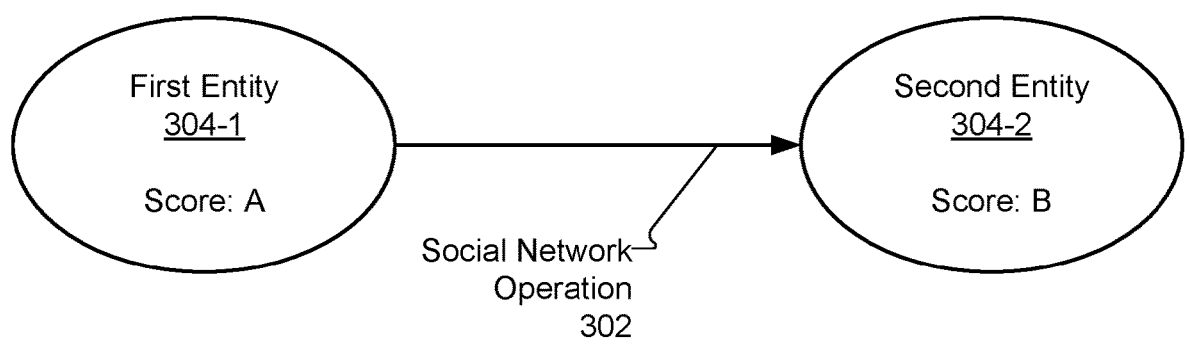
FIG. 3 illustrates an example of a social network operation directed from a first entity to a second entity according to principles described herein.

FIG. 3 illustrates an example of a social network operation 302 directed from a first entity (subject entity) 304-1 having a first existing popularity score "A" to a second entity (target entity) 304-2 having a second existing popularity score "B" in a media-content-based social network. Social network operation 302 may include any of the exemplary social network operations described herein, such as a create, follow, like, view, share, or comment operation directed from first entity 304-1 to second entity 304-2. Entity scoring facility 204 may detect the social network operation 302 directed from first entity 304-1 to second entity 304-2 and, in response, may adjust the popularity score of first entity 304-1 and/or the popularity score of second entity 304-2.

In certain examples, entity scoring facility 204 may adjust the popularity score of first entity 304-1 and/or the popularity score of second entity 304-2 by an amount proportional to the popularity score of first entity 304-1 at a time of social network operation 302. For instance, entity scoring facility 204 may multiply the existing popularity score of first entity 304-1 by a predefined adjustment factor to determine an amount proportional to the existing popularity score of first entity 304-1 and then add the product to or subtract the product from the popularity score of first entity 304-1 and/or the popularity score of second entity 304-2 to determine a new, adjusted popularity score of first entity 304-1 and/or a new, adjusted popularity score of second entity 304-2.

In certain examples, entity scoring facility 204 may determine a new, adjusted popularity score of second entity 304-2 (the target entity) based on the following equation, where P(subject) represents the existing popularity score of first entity 304-1 at the time of social network operation 302, P(target) represents the existing popularity score of second entity 304-2 at the time of social network operation 302, M represents a predefined adjustment factor, and P'(target) represents a new, adjusted popularity score of second entity 304-2.

$$P'(\text{target}) = P(\text{target}) + M \times P(\text{subject})$$

In accordance with this equation, entity scoring facility 204 may add an amount that is proportional to the existing popularity score of first entity 304-1 (proportional by adjustment factor M) to the existing popularity score of second entity 304-2 to determine and assign a new popularity score to second entity 304-2.

Additionally or alternatively, in certain examples, entity scoring facility 204 may determine a new, adjusted popularity score of first entity 304-1 (the subject entity) based on either of the following equations, where P(subject) represents the existing popularity score of first entity 304-1 at the time of social network operation 302, M represents the predefined adjustment factor, and P'(subject) represents a new, adjusted popularity score of first entity 304-1.

$$P'(\text{subject}) = P(\text{subject}) \times (1 - M)$$

$$P'(\text{subject}) = P(\text{subject}) - (M \times P(\text{subject}))$$

In accordance with either equation, entity scoring facility 204 may reduce the existing popularity score of first entity 304-1 by an amount that is proportional to the existing popularity score of first entity 304-1 (proportional by adjustment factor M).

By adjusting an existing popularity score of an entity by an amount that is proportional to the existing popularity score of the subject entity of a social network operation, entity scoring facility 204 may accurately represent realistic, relative popularities of entities in a media-content-based social network in a manner that may protect from artificial, inaccurate inflation of popularity scores. For example, the existing popularity score of the subject entity may be used to determine an amount by which to adjust the popularity score of the target entity to accurately reflect a strength of the social network operation directed from the subject entity to the target entity. Additionally or alternatively, where the subject entity represents a user, the user may be judicious in initiating social network operations directed from the subject entity at least because the popularity score of the subject entity may be adjusted accordingly (e.g., may be decreased by an amount proportional to the existing popularity score of the subject entity).

The social network operation 302 illustrated in FIG. 3 may represent a particular type of social network operation. In certain examples, an amount by which entity scoring facility 204 adjusts a popularity score (or refrains from adjusting a popularity score) in response to the social network operation may be based on the type of the social network operation. For example, entity scoring facility 204 may apply different proportions (e.g., different adjustment factors) for different types of social network operations. To this end, entity scoring facility 204 may maintain a different adjustment factor for each type of social network operation. Each type-specific adjustment factor may be used in place of adjustment factor M in the equations listed above. For example, an adjustment factor M(create) may be used when entity scoring facility 204 detects a create operation (e.g., a subject entity creates a target entity), an adjustment factor M(follow) may be used when entity scoring facility 204 detects a "follow" operation (e.g., a subject entity "follows" a target entity), an adjustment factor M(like) may be used when entity scoring facility 204 detects a "like" operation (e.g., a subject entity "likes" a target entity), an adjustment factor M(view) may be used when entity scoring facility 204 detects a "view" operation (e.g., a subject entity "views" a target entity), an adjustment factor M(share) may be used when entity scoring facility 204 detects a "share" or "reshare" operation (e.g., a subject entity "shares" or "reshares" a target entity), and an adjustment factor M(comment) may be used when entity scoring facility 204 detects a "comment" operation (e.g., a subject entity "comments on" a target entity). The proportions represented by these different adjustment factors may be defined as may suit a particular application. For example, M(follow) may be a first proportion (e.g., 1/100), M(like) may be a second proportion smaller than the first proportion (e.g., 1/1000), and M(view) may be a third proportion smaller than the first and/or second proportions (e.g., 1/10,000). M(create) may be any suitable proportion (e.g., 1/10) relative to the other proportions.

M(share) and M(comment) may be any suitable proportions relative to the other proportions.

Figure 4:
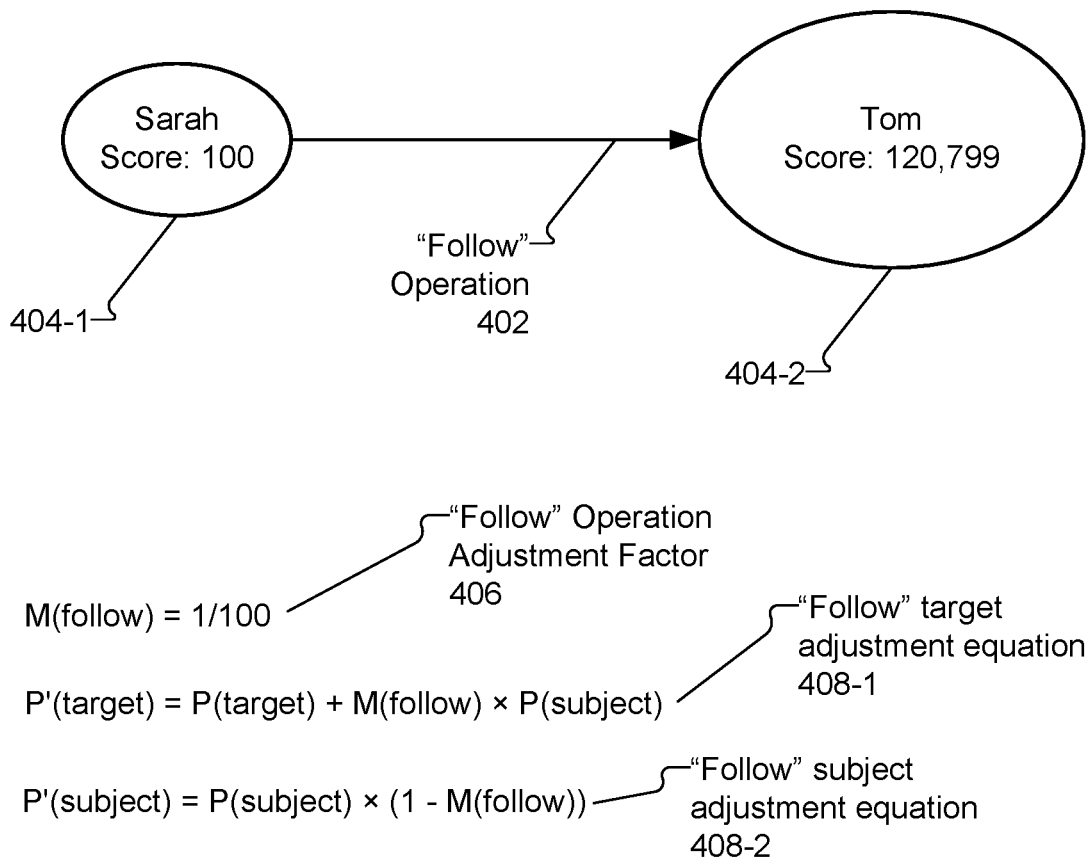
FIGS. 4-7 illustrate examples of a social network operations directed from a subject entity to a target entity, and adjustments of popularity scores of the subject and target user entities, according to principles described herein.

FIGS. 4-7 illustrate examples of a social network operations directed from a subject entity to a target entity, and adjustments of popularity scores of the subject and target entities. FIG. 4 illustrates an example of a "follow" social network operation 402 directed from a subject user entity 404-1 that represents a user "Sarah" with an existing popularity score of 100 popularity units to a target user entity 404-2 that represents a user "Tom" with an existing popularity score of 120,799 popularity units. A "follow" operation adjustment factor 406 indicates an adjustment factor M(follow) that entity scoring facility 204 may use to proportionally adjust the popularity score of the target and/or subject entities. "Follow" target adjustment equation 408-1 indicates an equation that entity scoring facility 204 may use to adjust the popularity score of target user entity 404-2. "Follow" subject adjustment equation 408-2 indicates an equation that entity scoring facility 204 may use to adjust the popularity score of subject user entity 402-1.

Figure 5:
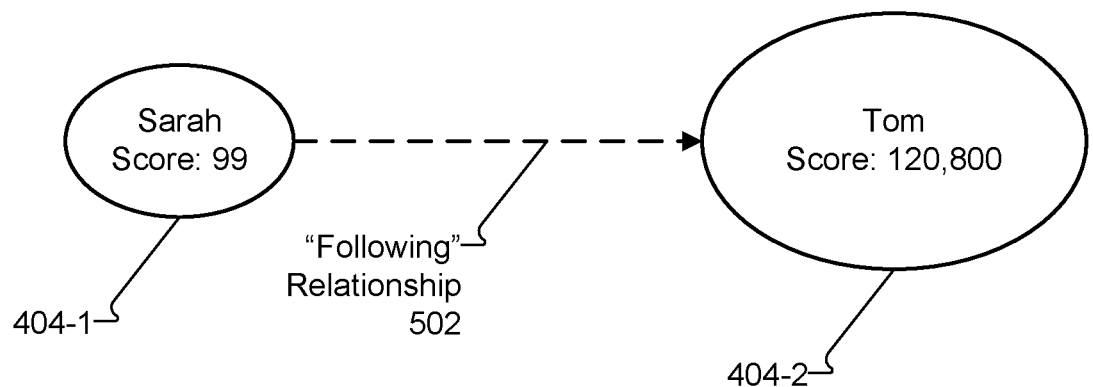

FIG. 5 illustrates the example illustrated by FIG. 4 at a time subsequent to entity scoring facility 204 adjusting the popularity scores of entities 404-1 and 404-2. As illustrated, entity 404-1 now has an adjusted popularity score of 99 popularity units, entity scoring facility 204 having decreased the popularity score of entity 404-1 by 1/100 of the popularity score of entity 404-1 (by one popularity unit). Entity 404-2 now has an adjusted popularity score of 120,800 popularity units, entity scoring facility 204 having increased the popularity score of entity 404-2 by 1/100 of the popularity score of entity 404-1 (by one popularity unit). Connector 502 indicates a newly established relationship between entity 404-1 and 404-2: user entity 404-1 (Sarah) is following user entity 404-2 (Tom).

Figure 6:
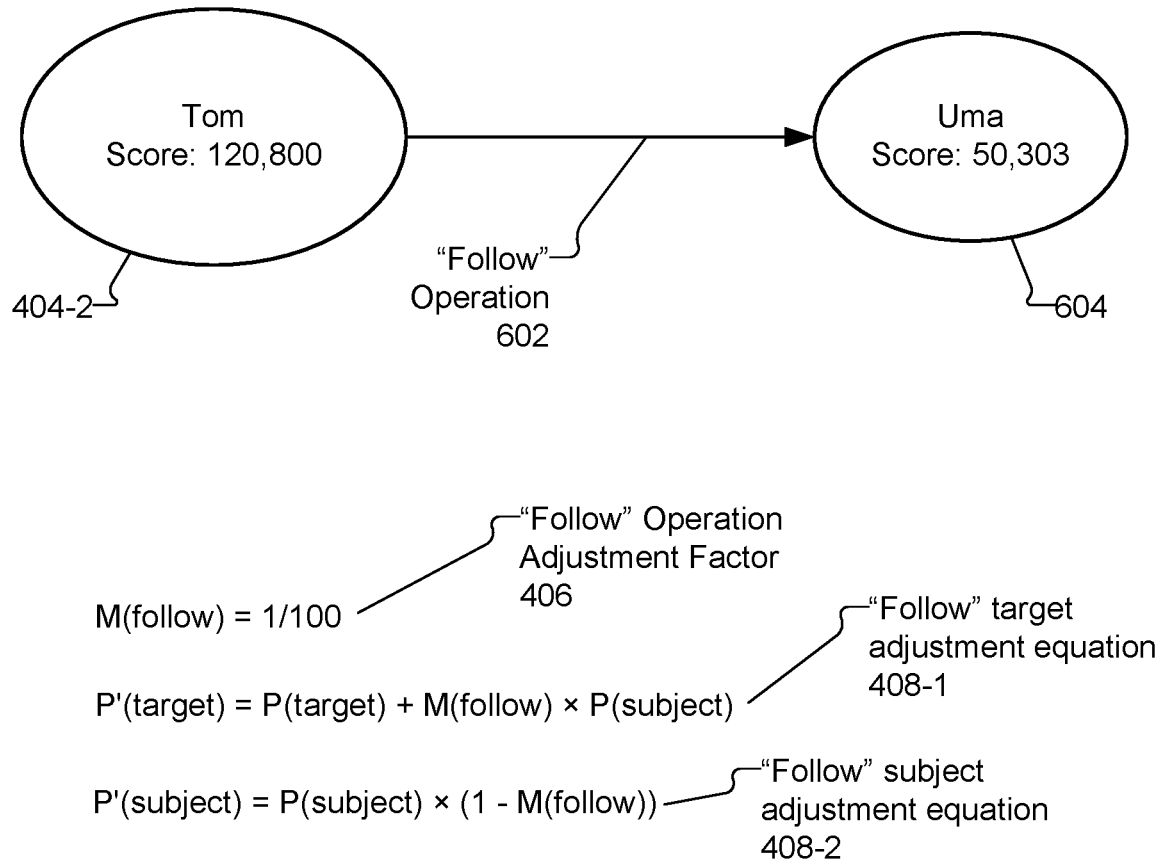

FIG. 6 illustrates an example of a "follow" social network operation 602 performed at a time subsequent to the example illustrated by FIG. 5. Social network operation 602 is directed from the user entity 404-2 that represents the user "Tom" with a popularity score of 120,800 popularity units to a user entity 604 that represents a user "Uma" with a popularity score of 50,303 popularity units. As in FIG. 4, "follow" operation adjustment factor 406 indicates an adjustment factor M(follow) that entity scoring facility 204 may use to adjust the popularity score of the target and/or subject entities. "Follow" target adjustment equation 408-1 indicates an equation that entity scoring facility 204 may use to adjust the popularity score of target user entity 604. "Follow" subject adjustment equation 408-2 indicates an equation that entity scoring facility 204 may use to adjust the popularity score of subject user entity 404-2.

Figure 7:
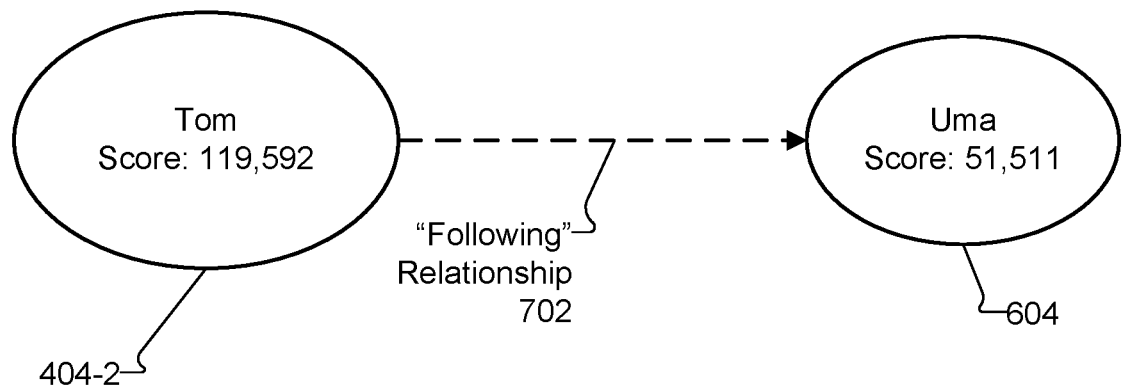

FIG. 7 illustrates the example illustrated by FIG. 6 at a time subsequent to entity scoring facility 204 adjusting the popularity scores of entities 404-2 and 604 in response to detecting social network operation 602. As shown, entity 404-2 now has an adjusted popularity score of 119,592 popularity units, entity scoring facility 204 having decreased the popularity score of entity 404-2 by 1/100 of the popularity score of entity 404-2 (by 1,208 popularity units). Entity 604 now has an adjusted popularity score of 51,511 popularity units, entity scoring facility 204 having increased the popularity score of entity 604 by 1/100 of the popularity score of entity 404-2 (by 1,208 popularity units). Connector 702 indicates a newly established relationship between entity 404-2 and 604: user entity 404-2 (Tom) is following user entity 604 (Uma).

As illustrated in the examples of FIGS. 4-7, an amount by which entity scoring facility 204 adjusts a popularity score may depend on the existing popularity score of a subject entity, which may cause the same type of social network operation to have different levels of strength depending on the subject entity. For instance, the "follow" social network operation illustrated in FIGS. 6-7 is relatively stronger than the "follow" social network operation illustrated in FIGS. 4-5 (i.e., results in a larger popularity score adjustment) because of the different existing popularity scores of the subject entities. That is, because entity 404-2 (Tom) is more popular than entity 404-1 (Sarah), the "follow" social network operation 602 performed by entity 404-2 (Tom) results in a larger popularity adjustment than the popularity adjustment caused by "follow" social network operation 402 performed by entity 404-1 (Sarah).

In some examples, certain social network operations between two entities may trigger a redistribution of popularity scores between the two entities. Such redistributions may maintain the same sum total of popularity scores of the entities, but redistribute a proportion of popularity from one entity to the other entity. For instance, in the examples illustrated in FIGS. 4-7, a "follow" social network operation triggers a redistribution of a proportion of popularity from the subject entity to the target entity, without changing the sum total of popularity of the two entities. In certain implementations, "like," "follow," and "view" social network operations may trigger such redistribution of popularity between entities.

In some examples, certain social network operations between two entities may trigger an overall increase or decrease in the sum popularity of the entities (rather than a redistribution). As an example, an addition of a target entity may trigger an addition of a proportion of popularity to the target entity without decreasing the popularity of the subject entity. As another example, a removal of a target entity may trigger a removal of the popularity of the target entity from the media-content-based social network, without changing the popularity of the subject entity. As yet another example, a sharing of a target entity or a comment on a target entity may trigger an addition of a proportion of popularity to the target entity without decreasing the popularity of the subject entity. As described further below, the popularity of a subject entity that shares or comments on a target entity may be adjusted in response to future operations on the target entity, based on an established share or comment relationship between the subject entity and the target entity.

In certain examples, entity scoring facility 204 may detect an operation between two entities in a media-content-based social network and, in response, may adjust the popularity score a third entity in the media-content-based social network, wherein the third entity may not be directly involved in the detected social networking operation (e.g., the third entity is not the subject or target of the detected operation). Entity scoring facility 204 may adjust the popularity score based at least in part on a relationship of the third entity to one or both of the two entities. Data associated with either of the two entities may indicate the relationship with the third entity and may be used by entity scoring facility 204 to identify the relationship. Entity scoring facility 204 may adjust the popularity score of the third entity based on an adjustment of the popularity score of the first entity and/or an adjustment of the popularity score of the second entity.

Figure 8:
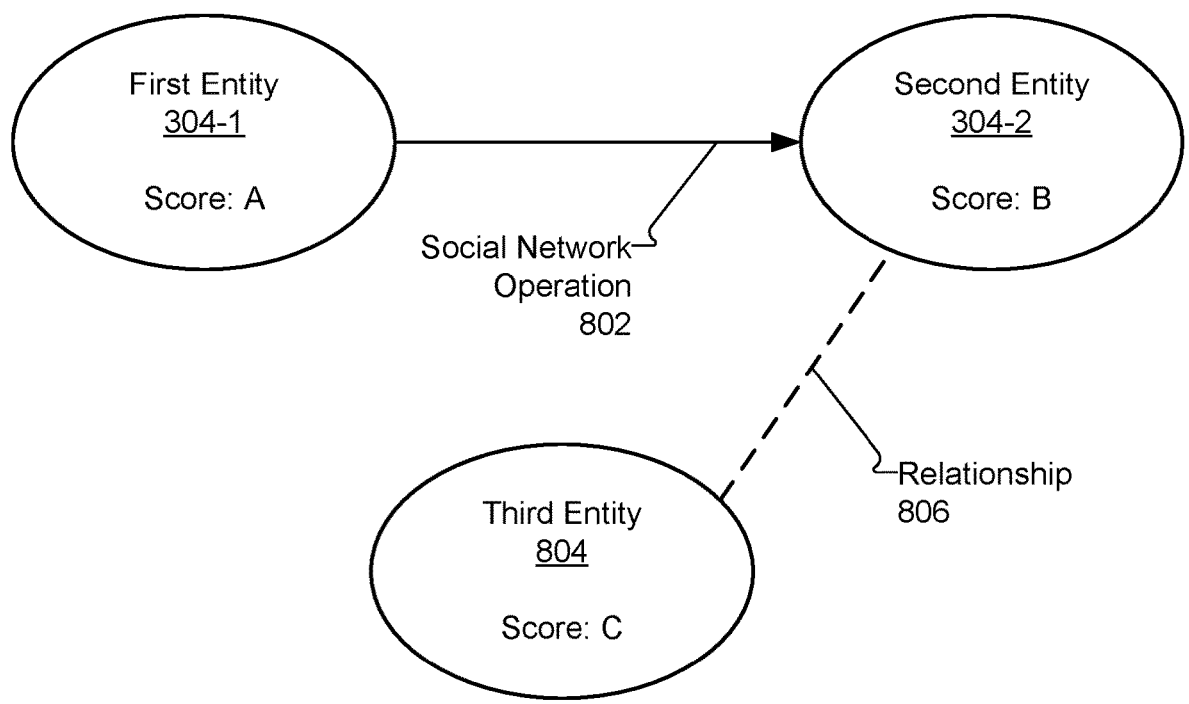
FIG. 8 illustrates an example of a social network operation directed from a first entity to a second entity, the detection of which may cause an adjustment in the popularity score of a third entity according to principles described herein.

FIG. 8 illustrates an example of a social network operation 802 directed from a first entity (subject entity) having a first existing popularity score "A" to a second entity (target entity) having a second existing popularity score "B" in a media-content-based social network. Entity scoring facility 204 may detect social network operation 802 and, in response, may adjust the popularity score of first entity 304-1, the popularity score of second entity 304-2, and/or the popularity score a third entity 804 having a third existing popularity score "C." The adjusting by entity scoring facility 204 of the popularity score of third entity 804 may be based on a relationship 806 between second entity 304-2 and third entity 804 and on the adjusting of the popularity score of second entity 304-2.

To illustrate, prior to social network operation 802 being performed, a social network operation directed from third entity 804 to second entity 304-2 may have been performed. For example, third entity 804 may have created second entity 304-2. In response, entity scoring facility 204 may have dynamically adjusted the popularity score of second entity 304-2 accordingly in any of the ways described above, such as by establishing an initial popularity score of second entity 304-2 in proportion to the existing popularity score of third entity 804.

Subsequent to the creation of second entity 304-2 by third entity 804, social network operation 802 may be performed. For example, first entity 304-1 may "like" second entity 304-2. Entity scoring facility 204 may detect the "like" social network operation 802 and, in response, proportionally adjust the popularity scores of first entity 304-1 and second entity 304-2, as described above. Entity scoring facility 204 may also detect the relationship 806 between second entity 304-2 and third entity 804 and, in response, may adjust the popularity score of third entity 804 in proportion to the popularity score of second entity 304-2 (e.g., proportional to an increase in the popularity score of second entity 304-2 due to the "like" social network operation 802).

Entity scoring facility 204 may adjust the popularity score of third entity 804 based on an adjustment factor associated with relationship 806 and/or the type of second entity 304-2. For example, if second entity 304-2 represents a comment created by third entity 804 about another entity (not shown), entity scoring facility 204 may use a "comment" adjustment factor to determine a proportional amount by which to adjust the popularity score of third entity 804. In certain examples, entity scoring facility 204 may determine a new, adjusted popularity score of third entity 804 based on the following equation, where P(third) represents the existing popularity score of third entity 804 at the time of social network operation 802, M(comment) represents a predefined adjustment factor for a comment-type entity, P(second) represents the popularity score of second entity 304-2, and P'(third) represents a new, adjusted popularity score of third entity 804.

$$P'(third)=P(third)+M(comment){\times}P(second)$$

If, instead of a comment, second entity 304-2 represents reshared content created by third entity 804 about another entity (not shown), entity scoring facility 204 may use a "reshare" adjustment factor to determine a proportional amount by which to adjust the popularity score of third entity 804. In such examples, entity scoring facility 204 may determine a new, adjusted popularity score of third entity 804 based on the above equation, where M(reshare) represents a predefined adjustment factor for a reshared-type entity is used in place of M(comment). In this or a similar manner, the flow of popularity between entities may be transitive based on certain types of relationships between entities.

To illustrate another example, prior to social network operation 802 being performed, a social network operation directed from third entity 804 to second entity 304-2 may have been performed. For example, third entity 804 may have commented on or reshared second entity 304-2. In response, entity scoring facility 204 may have dynamically adjusted the popularity score of second entity 304-2 accordingly in any of the ways described above, such as by increasing the popularity score of second entity 304-2 in proportion to the existing popularity score of third entity 804.

In addition, in response to the social network operation directed from third entity 804 to second entity 304-2 being a reshare or a comment operation, entity scoring facility 204 may add third entity 804 as a stakeholder in second entity 304-2. For example, entity scoring facility 204 may add data to second entity 304-2 to indicate that third entity 804 is a stakeholder in second entity 304-2 based on the reshare or comment operation directed from third entity 804 to second entity 304-2. This data may represent the relationship 806 and/or type of relationship 806 between second entity 304-2 and third entity 804.

Subsequent to second entity 304-2 being commented on or reshared by third entity 804, social network operation 802 may be performed. For example, first entity 304-1 may view, like, or follow second entity 304-2. Entity scoring facility 204 may detect the social network operation 802 and, in response, proportionally adjust the popularity scores of first entity 304-1 and second entity 304-2, as described above. Entity scoring facility 204 may also detect the relationship 806 between second entity 304-2 and third entity 804 and, in response, may adjust the popularity score of third entity 804 in proportion to the popularity score of second entity 304-2 (e.g., proportional to an increase in the popularity score of second entity 304-2 due to social network operation 802). Entity scoring facility 204 may detect the relationship 806 in any suitable way, such as based on stakeholder data for second entity 304-2.

In certain examples, entity scoring facility 204 may adjust the popularity score of third entity 804 by an amount proportional to an amount of change in the popularity score of second entity 304-2 due to social network operation 802 divided by a sum of the number of stakeholders of second entity 304-2. For example, entity scoring facility 204 may determine a new, adjusted popularity score of third entity 804 based on the following equation, where P(third) represents the existing popularity score of third entity 804 at the time of social network operation 802, M represents a predefined adjustment factor, $P_{increase}$(target) is the change in the popularity score of second entity 304-2 due to social network operation 802, $Stakeholders_{target}$ is the number of stakeholders of second entity 304-2, and P'(third) represents a new, adjusted popularity score of third entity 804.

$$P'(third)=P(third)+M{\times}P_{increase}(target)/(Stakeholders_{target})$$

In accordance with this equation, entity scoring facility 204 may increase the existing popularity score of third entity 804 by an amount proportional to (by adjustment factor M) the change in the popularity score of a target entity divided by a number of stakeholders of the target entity.

Figure 9:
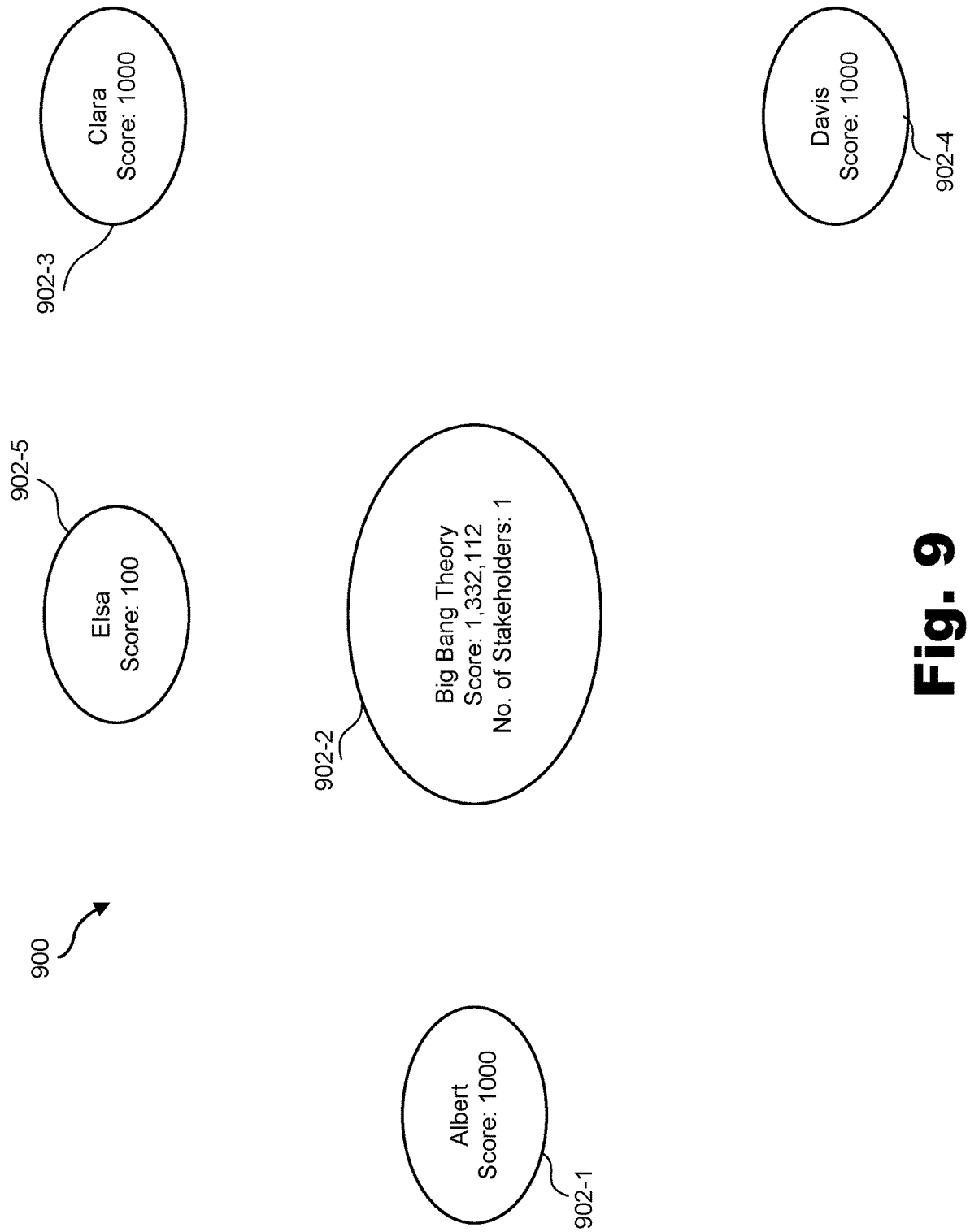
FIGS. 9-12 illustrate adjustments of popularity scores of entities in a media-content-based social network over time in response to detection of social network operations in the media-content-based social network according to principles described herein.

FIGS. 9-12 illustrate various adjustments of popularity scores of entities in a media-content-based social network that entity scoring facility 204 may perform over time in response to detected social network operations in the media-content-based social network. FIG. 9 illustrates an exemplary configuration 900 of entities 902 (e.g., entities 902-1 to 902-5) within a media-content-based social network. As shown, entity 902-1 represents a user entity for a user "Albert" with a popularity score of 1,000 popularity units, entity 902-2 represents a media profile for a television program titled "Big Bang Theory" with a popularity score of 1,332,112 popularity units and one stakeholder, entity 902-3 represents a user entity for a user "Clara" with a popularity score of 1,000 popularity units, entity 902-4 represents a user entity for a user "Davis" with a popularity score of 1,000 popularity units, and entity 902-5 represents a user entity for a user "Elsa" with a popularity score of 100 popularity units.

Figure 10:
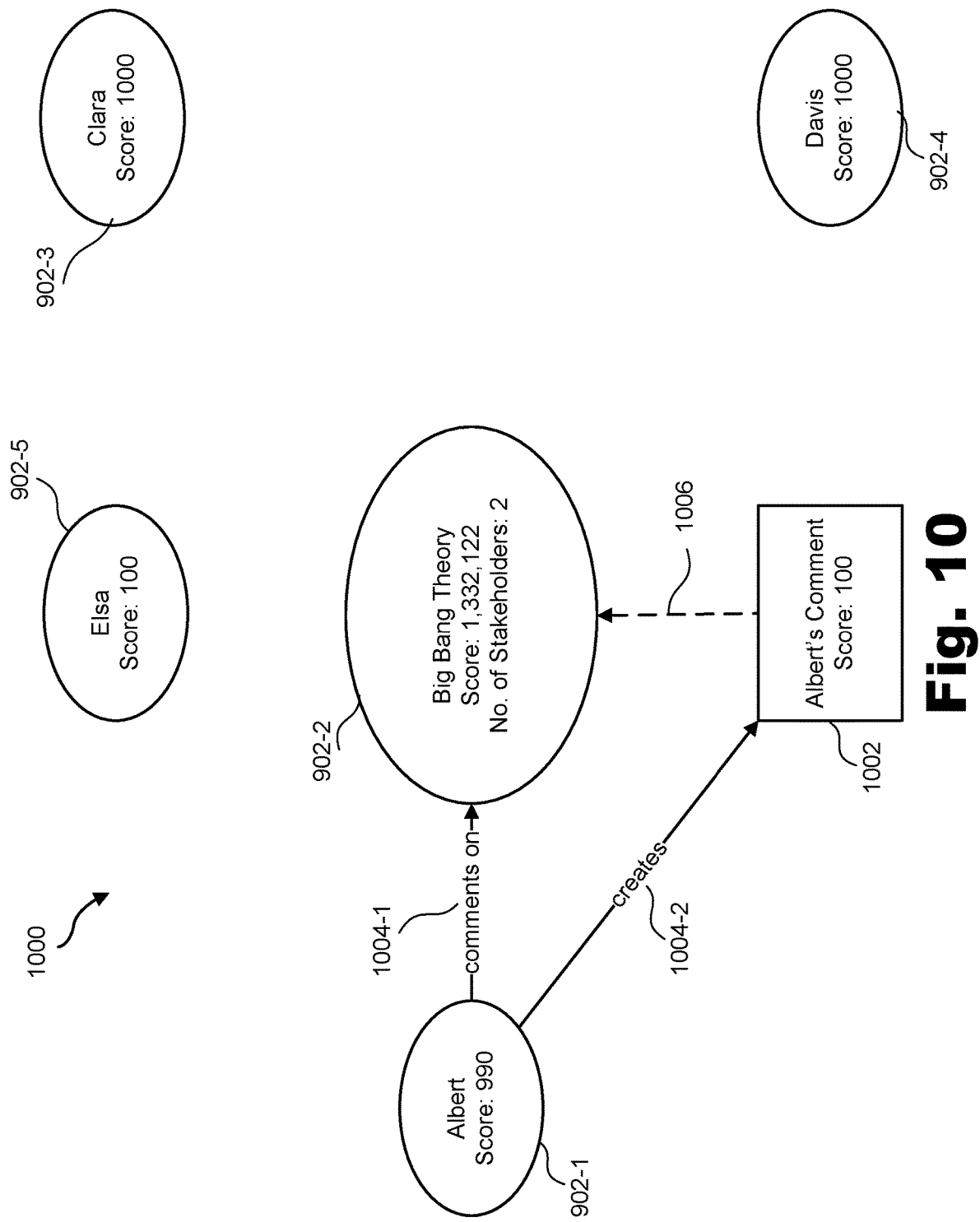

FIG. 10 illustrates a configuration 1000 of entities and relationships in the media-content-based social network of configuration 900 after entity scoring facility 204 detects the creation of a new entity in the media-content-based social network and adjusts popularity scores of entities in the media-content-based social network in response to detecting the social networking operation. Configuration 1000 is similar to configuration 900, with the addition of comment entity 1002 ("Albert's Comment") with a popularity score of 100 popularity units, as well as arrows 1004 (e.g., arrows 1004-1 and 1004-2) indicating operations performed within the media-content-based social network between entities 902-1, 902-2, and 1002 (e.g., entity Albert commenting on entity Big Bang Theory and entity Albert creating entity Albert's Comment). FIG. 10 also shows connector 1006 that indicates a relationship between entities 902-2 and 1002 (e.g., entity 1002 is a comment related to entity 902-2). As shown, Albert has authored a comment (entity 1002) on the social network profile of the television show Big Bang Theory (entity 902-2). Entity scoring facility 204 has detected the operation, and has adjusted (i.e., increased) the popularity score of Big Bang Theory proportional to (i.e., 1/100) Albert's popularity, from 1,332,112 to 1,332,122 popularity units (by ten popularity units). Likewise, entity scoring facility 204 has adjusted Albert's popularity by an amount proportional to (i.e., 1/100) Albert's popularity (by ten popularity units) to 990 popularity units from 1,000 popularity units. Entity scoring facility 204 has also increased the number of stakeholders in Big Bang Theory from one to two by adding Albert as a stakeholder in Big Bang Theory.

Figure 11:
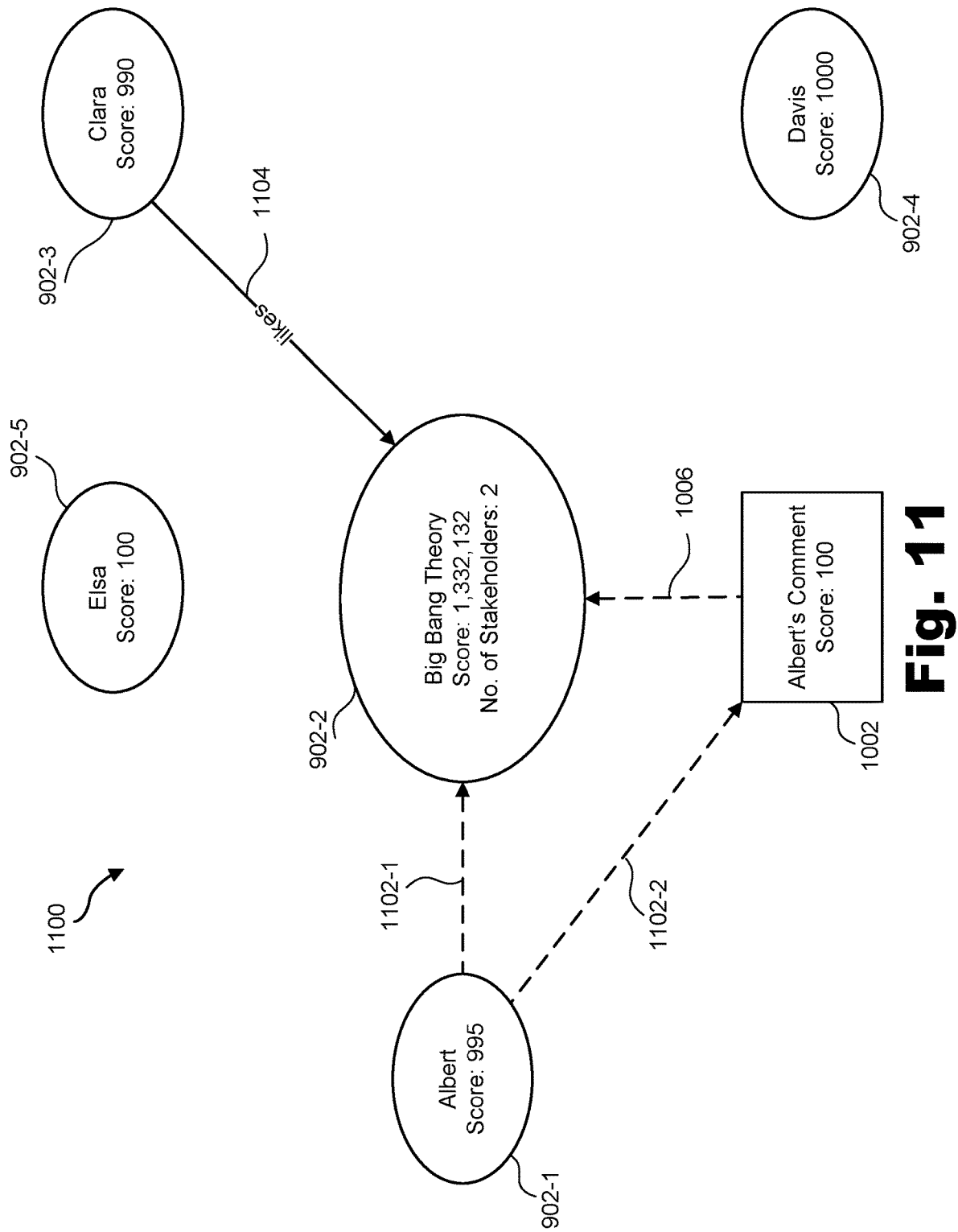

FIG. 11 illustrates a configuration 1100 of entities in the media-content-based social network of configuration 1000 after entity scoring facility 204 detects a social network operation between entities 902-2 and 902-3 and adjusts popularity scores of entities in the media-content-based social network in response to detecting the social networking operation. Configuration 1100 is similar to configuration 1000, with the addition of connectors 1102 (e.g., connectors 1102-1 and 1102-2) indicating relationships between entities 902-1, 902-2, and 1002 (e.g., Albert is the author of Albert's Comment, and Albert's Comment regards Big Bang Theory), as well as the addition of arrow 1104 pointing from entity 902-3 to entity 902-2, indicating an operation of user Clara indicating that she "likes" Big Bang Theory at a time subsequent to the time that user Albert created entity 1002 (e.g., user Albert authored Albert's Comment regarding Big Bang Theory prior to user Clara "liking" Big Bang Theory).

In the operation indicated by arrow 1104 (e.g., user Clara's "liking" of Big Bang Theory after user Albert authored Albert's Comment regarding Big Bang Theory), entity 902-3 is the subject and entity 902-2 is the target. In response to detecting this operation, entity scoring facility 204 adjusts the popularity score of entity 902-2 in an amount proportional to the popularity score of entity 902-3 (Big Bang Theory's popularity score is adjusted from 1,332,122 popularity units to 1,332,132 popularity units, or increased by ten popularity units, one percent of Clara's popularity score of 1,000 popularity units), and entity scoring facility 204 adjusts entity 902-3's popularity score in an amount proportional to the popularity score of entity 902-3 (e.g., Clara's popularity score is decreased by one percent of Clara's popularity score, from 1,000 popularity units to 990 popularity units). Additionally, entity scoring facility 204 adjusts the popularity score of entity 902-1 (increases Albert's popularity score) by five popularity units (from 990 popularity units to 995 popularity units), which is proportional to (one half of) the increase in the popularity score of Big Bang Theory (an increase of 10 popularity units) divided by the number of stakeholders of Big Bang Theory (2 stakeholders).

Figure 12:
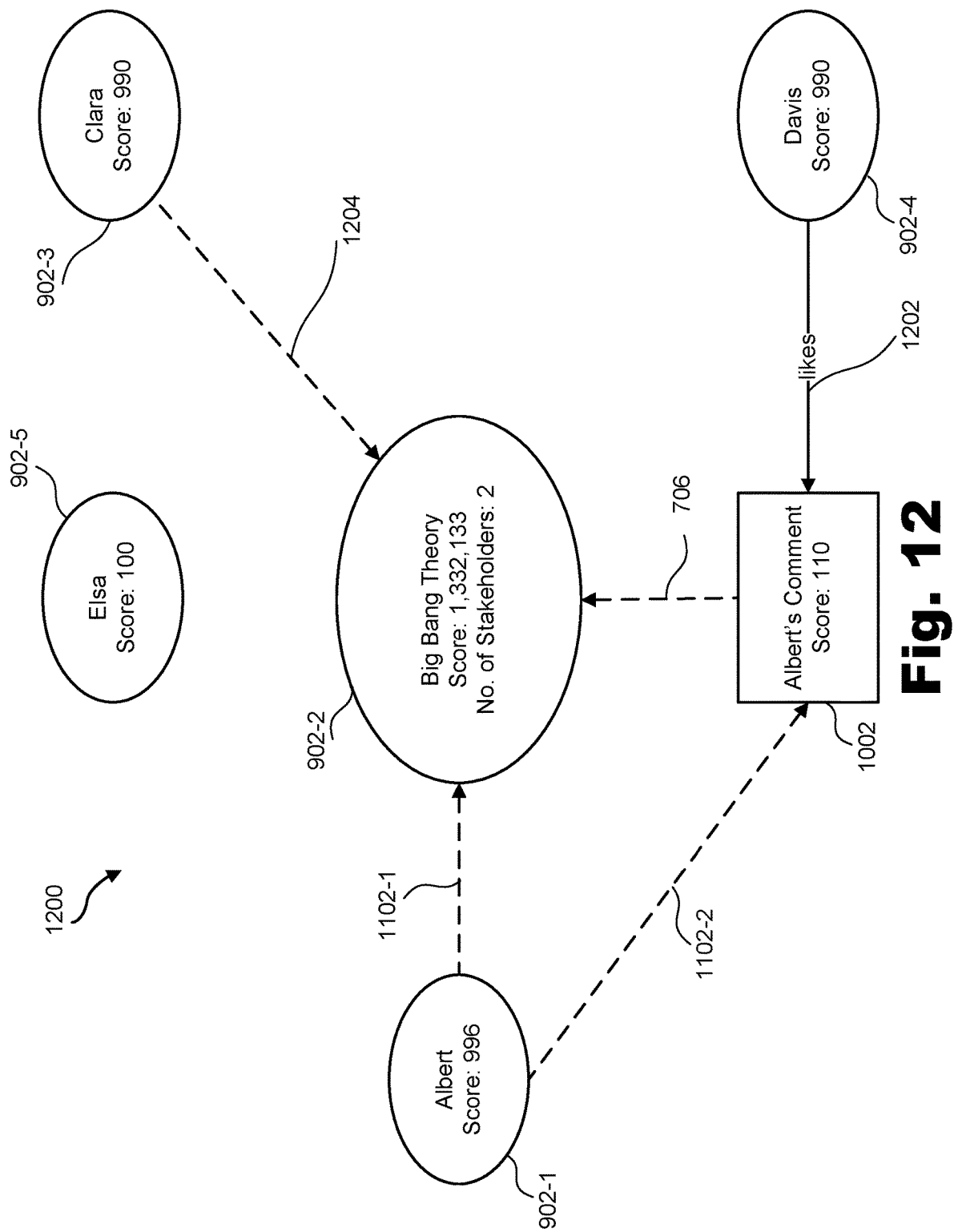

FIG. 12 illustrates a configuration 1200 of entities in the media-content-based social network of configuration 1100 after entity scoring facility 204 detects a social network operation between entities 902-4 and 1002 and adjusts popularity scores of entities in the media-content-based social network in response to detecting the social networking operation. Configuration 1200 is similar to configuration 1100, with arrow 1104 omitted and arrow 1202 added, arrow 1202 pointing from entity 902-4 to entity 1002 and indicating an operation of user Davis indicating that he "likes" Albert's Comment about Big Bang Theory at a time subsequent to the time that user Albert created entity Albert's Comment regarding Big Bang Theory, and subsequent to the time user Clara indicated that she "liked" entity Big Bang Theory.

In the operation indicated by arrow 1202 (e.g., Davis's "liking" of Albert's Comment about Big Bang Theory), entity 902-4 is the subject and entity 1002 is the target. In response to the detecting of the operation indicated by arrow 1202, entity scoring facility 204 adjusts the popularity score of entity 1002 in an amount proportional to the popularity score of entity 902-4 (the popularity score of Albert's Comment about Big Bang Theory is increased by ten popularity units from 100 popularity units to 110 popularity units, or one percent of Davis's popularity score of 1,000 popularity units), and further adjusts entity 902-4's popularity score in an amount proportional to the popularity score of entity 902-4 (decreases Davis's popularity score by one percent of Davis's popularity score, from 1,000 popularity units to 990 popularity units). In addition, in response to entity scoring facility 204 detecting the operation indicated by arrow 1202, entity scoring facility 204 adjusts (e.g., increases) the popularity score of entity 902-1 by an amount proportional to (e.g., one percent of, or one popularity unit) the unadjusted popularity score of entity 1002, from 995 popularity units to 996 popularity units. Likewise, entity scoring facility 204 adjusts (e.g., increases) the popularity score of entity 902-2 by an amount proportional to (e.g., one percent of, or ten popularity units) the unadjusted popularity score (e.g., 100 popularity units) of entity 1002.

While certain examples of operation-based popularity scoring of entities in a media-content-based social network have been described above, those examples are illustrative only. Other examples may include additions to, reductions from, and/or variations on the illustrated examples. Examples of such additions, reductions, and/or variations may include, without limitation, using adjustment factors that are specific to types of entities, removing the popularity score of an entity when the entity is removed from the media-content-based social network, redistributing popularity in response to other social network operations (e.g., redistributing popularity in response to an "unfollow" operation, and/or dynamically adjusting a popularity score of an entity at any time after a social network operation is detected (e.g., immediately in real time or as part of a scheduled batch of operation-based adjustments).

In certain examples, entity scoring facility 204 may allow for a decay in the popularity value of an entity over time. For example, entity scoring facility 204 may reduce the popularity scores of "stale" entities (e.g., entities that have not been involved in any social network operations for a defined period of time). Entity scoring facility 204 may identify a "stale" entity in any suitable way and using any suitable period of time. Entity scoring facility 204 may use any suitable adjustment factor to determine an amount by which to decay the popularity score of a "stale" entity.

For example, an entity in the media-content-based social network may be assigned a popularity score in any of the ways described herein and a time-to-live (TTL) value. Entity scoring facility 204 may use the TTL value of the first entity to determine if the entity has become stale. For example, the TTL value may begin with a value representing a defined period of time. As time passes, entity scoring facility 204 may decrement the TTL value accordingly. If an operation involving the entity is detected, entity scoring facility 204 may reset the TTL value to the beginning value representing the defined period of time. If no operation involving the entity is detected within the period of time, the TTL value may expire. Entity scoring facility 204 may detect the expiration of the TTL value of the entity and adjust the popularity score of the entity based on a predetermined decay function. For example, entity scoring facility 204 may decrease the popularity score of the entity by a fixed proportion of the existing popularity score of the entity (e.g., by a fixed percentage). Entity scoring facility 204 may then reset the TTL value of the entity to the beginning value representing the defined period of time.

Entity scoring facility 204 may cause entity popularity scores to decay as part of a state-based scoring process and/or as part of an operation-based scoring process. For example, as part of a state-based scoring process, entity scoring facility 204 may check TTL values of all entities in the media-content-based social network and adjust the popularity scores of any entities having expired TTL values in accordance with a decay function. As another example, as part of an operation-based scoring process, entity scoring facility 204 may detect an expiration of a TTL value of an entity and, in response, may adjust the popularity score of the entity in accordance with a decay function.

By way of illustration, suppose that an entity representing a user comment regarding an episode of a television program has a popularity score of 100, a TTL of twenty-four hours, and a decay factor of ten percent. After expiration of a predetermined length of time (e.g., a time equal to the TTL), if no social network operations involving the user comment have occurred, entity scoring facility 204 may detect the lack of social network operations involving the user comment and assign to the user comment a new, adjusted popularity score of ninety popularity units.

By causing the popularity scores of "stale" entities to decay over time, entity scoring facility 204 may accurately represent realistic, relative popularities of entities in a media-content-based social network in a manner that may protect from artificial, inaccurate inflation of popularity scores. Additionally or alternatively, media content in the media-content-based social network that is newer, more popular, and/or has more immediate social attention may have higher popularity scores than media content that is no longer current and/or that has dropped from the collective attention of the users of the media-content-based social network, leading to improved media content discovery and/or distribution through the media service (e.g., by prioritizing media content within a media service user interface by popularity scores of entities representative of the media content in a media-content-based social network). Additionally or alternatively, where the entity represents a user, the user may be motivated to participate in social network operations within the media-content-based social network consistently to prevent a decline in his or her popularity score.

Figure 13:
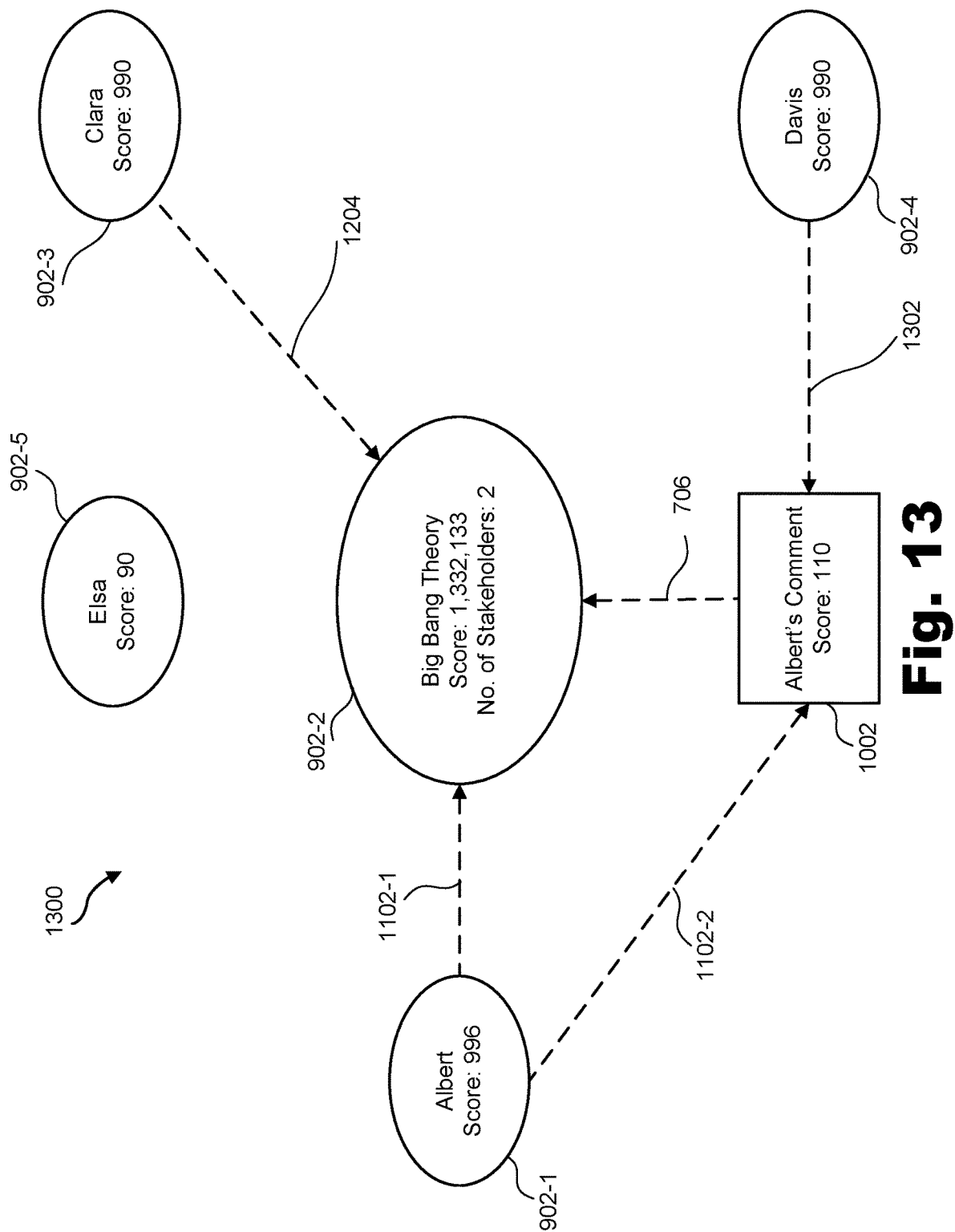
FIG. 13 illustrates a configuration of entities in a media-content-based social network, and adjustments of popularity scores after detection of a lack of social network operations according to principles described herein.

FIG. 13 illustrates a configuration 1300 of entities in the media-content-based social network of configuration 1200 after entity scoring facility 204 detects a lack of social network operations involving entity 902-5 for a time equal to the TTL for entity 902-5. Configuration 1300 is similar to configuration 1200, with arrow 1202 omitted and connector 1302 added, indicating a relationship between entities 902-4 and 1002 (e.g., user Davis "likes" Albert's Comment). User entity 902-5, representative of user "Elsa," has not been involved in any social network operations during the TTL, causing entity scoring facility 204 to assign a "decayed" popularity score to user entity 902-5 by using a decay factor of ten percent to determine a new popularity score for user entity 902-5 of ninety popularity units, a decrease of ten popularity units from the entity's previous popularity score of 100 popularity units.

In certain examples, entity scoring facility 204 may use a hybrid combination of state-based and operation-based popularity scoring processes to score popularity of entities in a media-content-based social network. For example, in addition to dynamically adjusting popularity scores of entities in response to detected social network operations in any of the ways described herein, entity scoring facility 204 may periodically perform a state-based popularity scoring process in any of the ways described herein. In some examples, the performance of a state-based popularity scoring process may serve to normalize popularity scores, which may have been dynamically adjusted since the state-based popularity scoring process was previously performed, based on the current state of attributes of the entities in the media-content-based social network.

As mentioned above, media service customization facility 202 may customize a media service based at least in part on the popularity scores of a plurality of entities included in the media-content-based social network. Configuration 100 may implement this customization in any suitable way, including as an operation of a user computing system 102, an operation of entity scoring server system 110, an operation of media service server system 106, and/or an operation of media-content-based social network server system 108. The customization of the media service may include media service customization facility 202 customizing a media service user interface for an end user based at least in part on the popularity scores of the plurality of entities included in the media-content-based social network, and providing the customized media service user interface for presentation to an end user. Examples of media service customization facility 202 customizing a media service user interface based at least in part on popularity scores of a plurality of entities included in a media-content-based social network will now be described.

Figure 14:
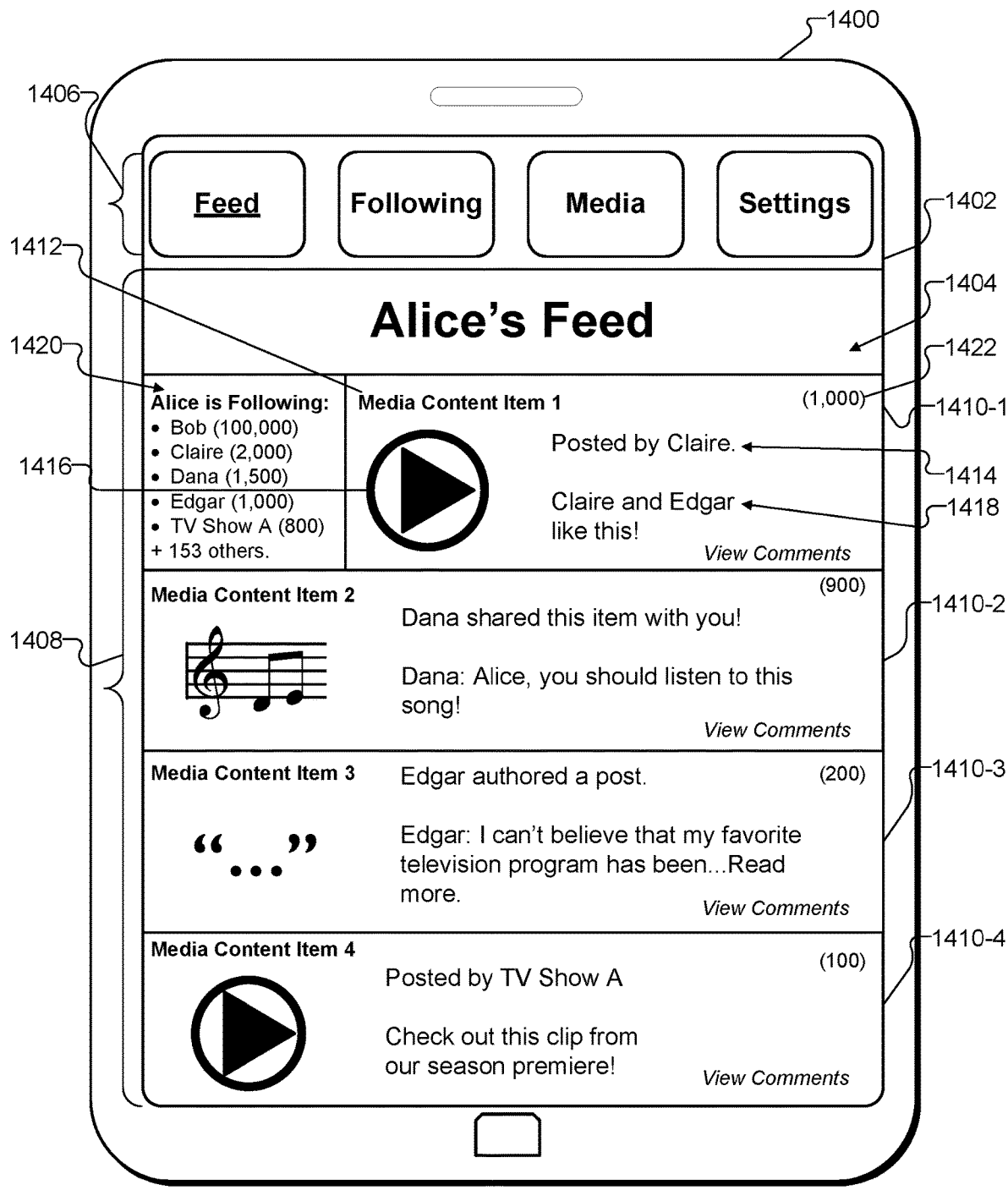
FIGS. 14-15 show an exemplary user device on which an exemplary on-screen media service user interface is presented according to principles described herein.
Figure 15:
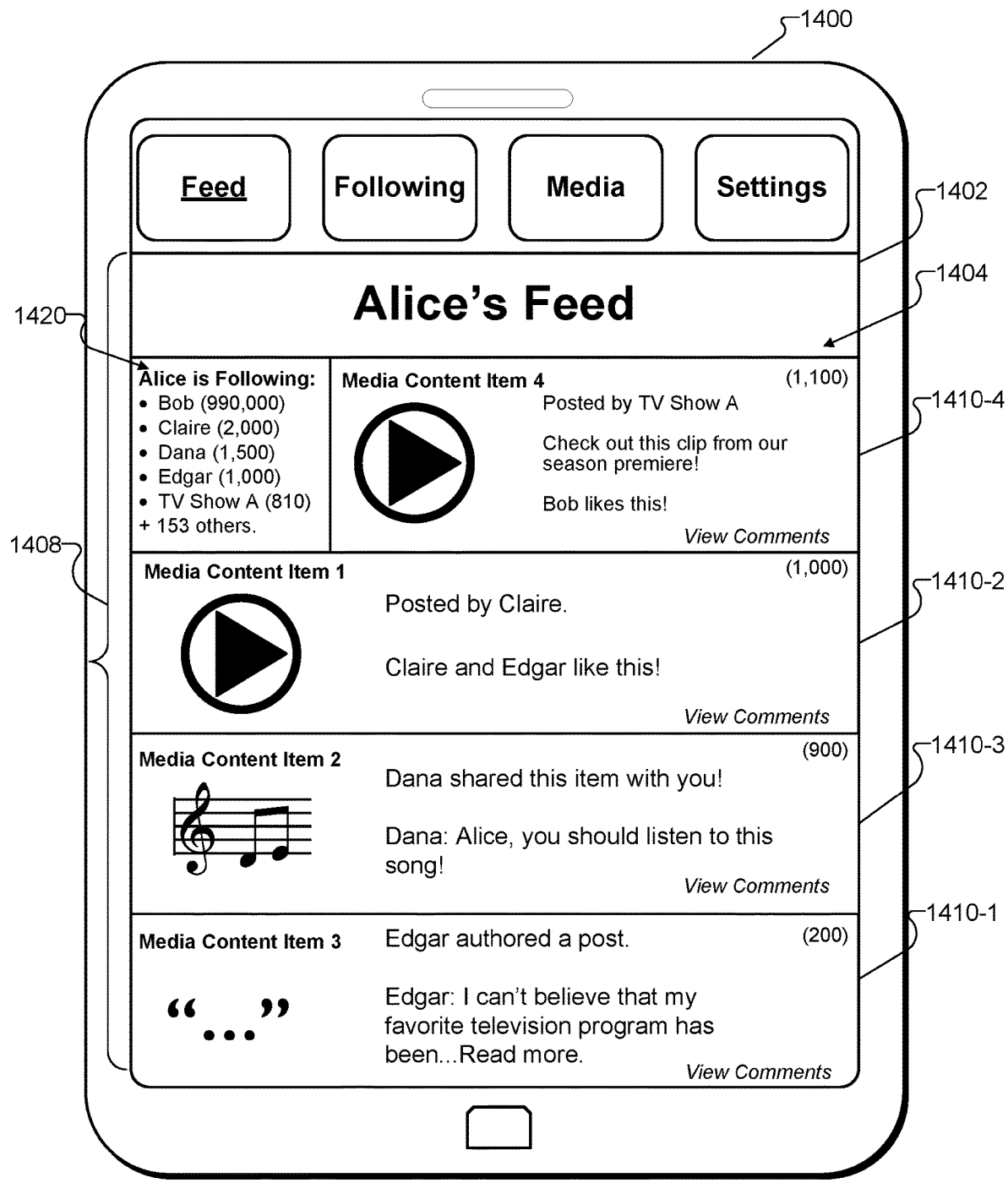

FIGS. 14-15 show an exemplary user device 1400 having a display screen 1402 on which a media service user interface 1404 associated with a media service is presented. In particular, FIGS. 14-15 illustrate various views of the exemplary media service user interface 1404. As will be described in more detail below, media service user interface

1404 may include various graphical items representative of media content items available for presentation to a user by way of user device 1400.

Various controls may be implemented within user interface 1404 to allow the user of user device 1400 to interact with the media service. For example, in FIGS. 14-15, control area 1406 includes various control buttons, including a "Feed" button, a "Following" button, a "Media" button, and a "Settings" button. Upon selection of each of the buttons in control area 1406, the user may be presented with different interface views for interacting with the media service, such as a media feed 1408. Media feed 1408 may include information about the user and/or interaction of the user with the media. For example, in FIGS. 14-15, media feed 1408 is titled "Alice's Feed", indicating that it is a media feed customized for the user Alice.

Media feed 1408 may include interface elements representative of one or more media content items, including media elements 1410 (e.g., media elements 1410-1, 1410-2, 1410-3, and 1410-4). Upon user selection of one of the media elements 1410, the selected media content item may be presented to the user (e.g., played back to the user).

Each media element 1410 may include a title 1412 of the particular media content item represented by the respective media element 1410. For example, as illustrated in FIGS. 14-15, media element 1410-1 has a title 1412 of "Media Content Item 1". Each media element 1410 may also include an indicator showing what user of the media-content-based social network introduced the item into the media-content-based social network, or brought the particular media content item to the user's attention. For example, indicator 1414 indicates that media-content-based social network user "Claire" posted "media content item 1" to the media-content-based social network. In addition, each media element 1410 may include an icon 1416 indicating a type of media content represented by the respective media element 1410. For example, icon 1416 in FIG. 14 may indicate that the media content item represented by media element 1410-1 is a video. Corresponding icons may indicate that a media element 1410 represents an audio presentation, such as media element 1410-2, or a text-based media content item, such as in media element 1410-3. Other types of media content items may be represented in user interface 1404 that are not shown in FIGS. 14-15.

Interface elements within user interface 1404 associated with media elements 1410 may indicate social network operations within the media-content-based social network that may be associated with the media content items represented by media elements 1410. For example, social media indicator 1418 shows that media-content-based social network users Claire and Edgar have "liked" the media content item represented by media element 1410-1. Similar social media indicators within other illustrated media elements indicate other social network operations associated with the media content items represented by the other illustrated media elements. For example, media element 1410-2 indicates that user Dana shared the media content item represented by media element 1410-2 with user Alice. Additional examples illustrated in FIGS. 14-15 include media element 1410-3 indicating that it represents a media content item of a post authored by user Edgar, and media element 1410-4 indicating that it represents a video clip posted to the media-content-based social network by a user associated with TV Show A.

User interface 1404 may include other interface elements that may assist the user in interacting with the media service and/or the media-content-based social network. For example, user interface pane 1420 shows a list of other users of the media-content-based social network that user Alice is following. For purposes of illustration, the list of users includes a popularity score for each of the users in parentheses following the user's name. While displayed here for illustrative purposes, popularity scores of entities within the media-content-based social network may or may not be displayed to end users.

The list shown by user interface pane 1420 may be arranged in any suitable way, but for the purposes of illustration, the list shown by user interface pane 1420 is arranged in a descending order of popularity score. Thus, user Bob has a higher popularity score (100,000 popularity units) than user Claire, user Claire has a higher popularity score (2,000 popularity units) than user Dana, user Dana has a higher popularity score (1,500 popularity units) than user Edgar, and user Edgar has a higher popularity score (1,000 popularity units) than TV Show A (800 popularity units).

In addition, for illustrative purposes, each media element 1410 includes a popularity score 1422, indicating a popularity score of the media content item represented by the respective media element 1410. While displayed here for illustrative purposes, popularity scores of entities within the media-content-based social network may or may not be displayed to end users.

Media service customization facility 202 may customize user interface 1404 in any suitable way. For example, as illustrated in FIG. 14, media elements 1410 are arranged within feed 1408 in a descending order of the popularity scores of the associated entities in the media-content-based social network. Specifically, Claire's post of media content item 1, represented by media element 1410-1, is positioned more prominently within feed 1408 than media elements 1410-2, 1410-3, or 1410-4, representing Dana's sharing of media content item 2, Edgar's authoring of media content item 3, and TV Show A's posting of media content item 4, respectively.

FIG. 15 illustrates the interface 1402 of FIG. 14 at a point in time after relatively popular media-content-based social network user Bob has "liked" media content item 4, and entity scoring facility 204 has adjusted the popularity scores of entities in the media-content-based social network in response to detecting that social network operation. As shown in FIG. 15, entity scoring facility 204 has adjusted the popularity scores of user Bob, TV Show A, and media content item 4. Entity scoring facility 204 has adjusted the popularity score of media content item 4 by an amount proportionate to the popularity score of user Bob (e.g., the popularity score of media content item 4 has increased by one percent of Bob's popularity score to 1,100 popularity units). Likewise, user Bob's popularity has been adjusted in an amount proportionate to his popularity score (e.g., Bob's popularity score has been reduced by one percent of his former popularity score to 990,000 popularity units).

As TV Show A posted media content item 4, entity scoring facility 204 has also adjusted the popularity score of TV Show A by an amount proportionate to the unadjusted popularity score of media content item 4 (e.g., the popularity score of TV Show A has been increased by ten percent of the unadjusted popularity score of media content item 4, or ten popularity units, to 810 popularity units).

Media service customization facility 202 has customized user interface 1404, based on the adjusted popularity scores, to now show media element 1410-4, representing media content item 4, in a more prominent position within feed 1408 than media element 1410-1, representing media content item 1, and the other media elements. This is because entity scoring facility 204 has detected popular user Bob's "liking" of media content item 4, and has adjusted the popularity score of the entity in the media-content-based social network representing media content item 4, causing the entity representing media content item 4 to now have a higher popularity score than the other entities representing media content items corresponding to media elements 1410. Media service customization facility 202 has customized user interface 1404 accordingly, placing media content item 4 in the most prominent position within feed 1408, above media elements 1410 representing media content items with lower popularity scores. However, user Bob is still the user with the highest popularity score, and TV Show A still has the lowest popularity score, so they remain in their respective positions at the top and bottom of the list in user interface pane 1420.

While FIGS. 14-15 illustrate one example of customizing a media service based on popularity scores of entities in a media-content-based social network, the example is illustrative only. Media service customization facility 202 may customize the media service in additional and/or alternative way, including any of the ways described herein.

Figure 16:
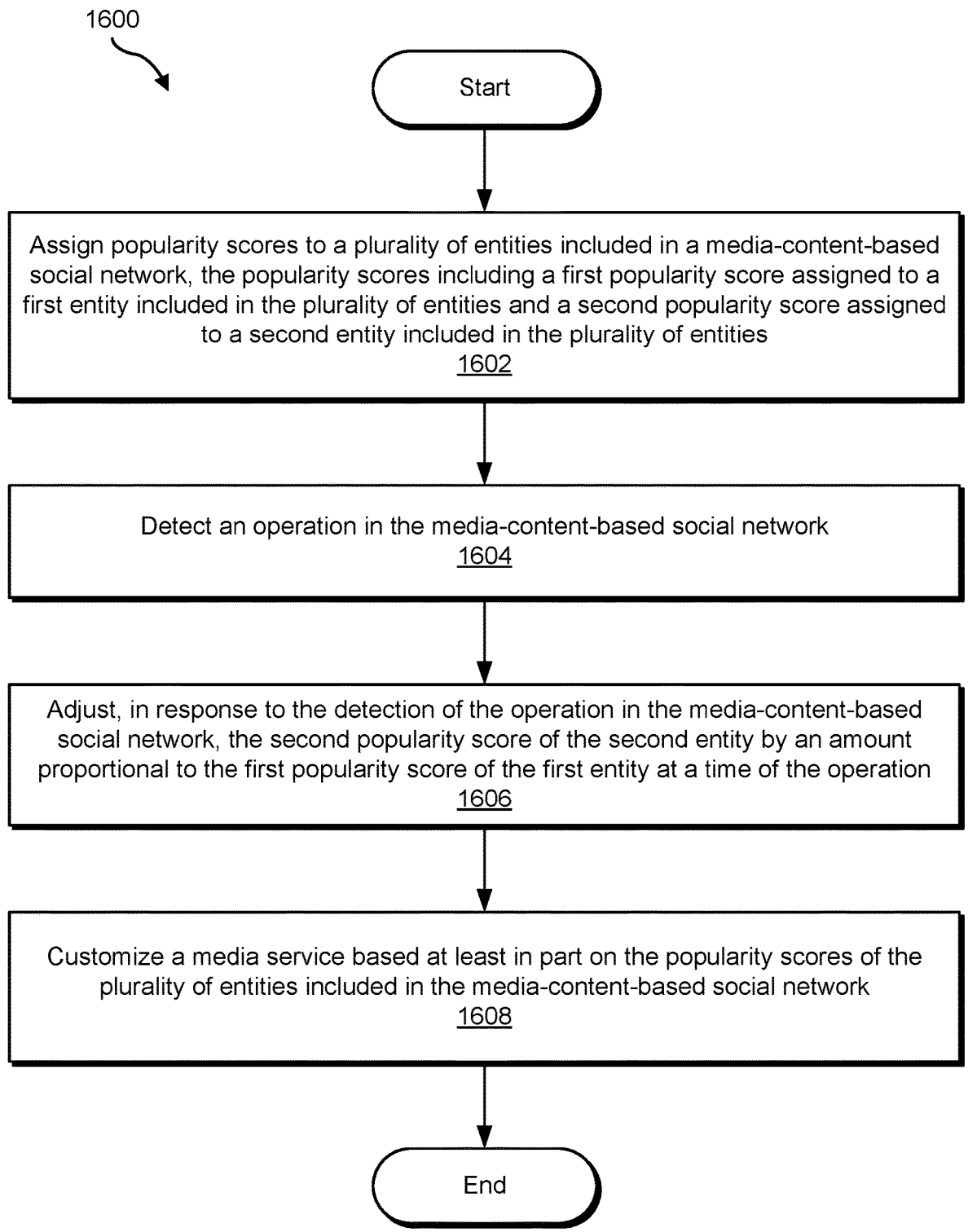
FIGS. 16-17 illustrate exemplary methods for scoring and using popularity of entities in a media-content-based social network to provide a media service according to principles described herein.

FIG. 16 illustrates an exemplary method for scoring and using popularity of entities in a media-content-based social network to provide a media service. While FIG. 16 illustrates exemplary operations according to one embodiment, other embodiments may omit, add to, reorder, and/or modify any of the operations shown in FIG. 16. One or more of the operations shown in FIG. 16 may be performed by system 200 and/or any implementation thereof.

In operation 1602, a media service system assigns popularity scores to a plurality of entities included in a media-content-based social network. The popularity scores may include a first popularity score assigned to a first entity included in the plurality of entities and a second popularity score assigned to a second entity included in the plurality of entities. Operation 1602 may be performed in any of the ways described herein.

In operation 1604, the media service system detects an operation in the media-content-based social network. Operation 1604 may be performed in any of the ways described herein.

In operation 1606, the media service system adjusts, in response to the detection of the operation in the media-content-based social network, the second popularity score of the second entity by an amount proportional to the first popularity score of the first entity at a time of the operation. Operation 1606 may be performed in any of the ways described herein. While not illustrated in FIG. 16, the media service system may alternatively or additionally adjust one or more popularity scores of one or more entities in the media-content-based social network in response to the detection of the operation.

In operation 1608, the media service system customizes a media service based at least in part on the popularity scores of the plurality of entities included in the media-content-based social network. Operation 1608 may be performed in any of the ways described herein.

Figure 17:
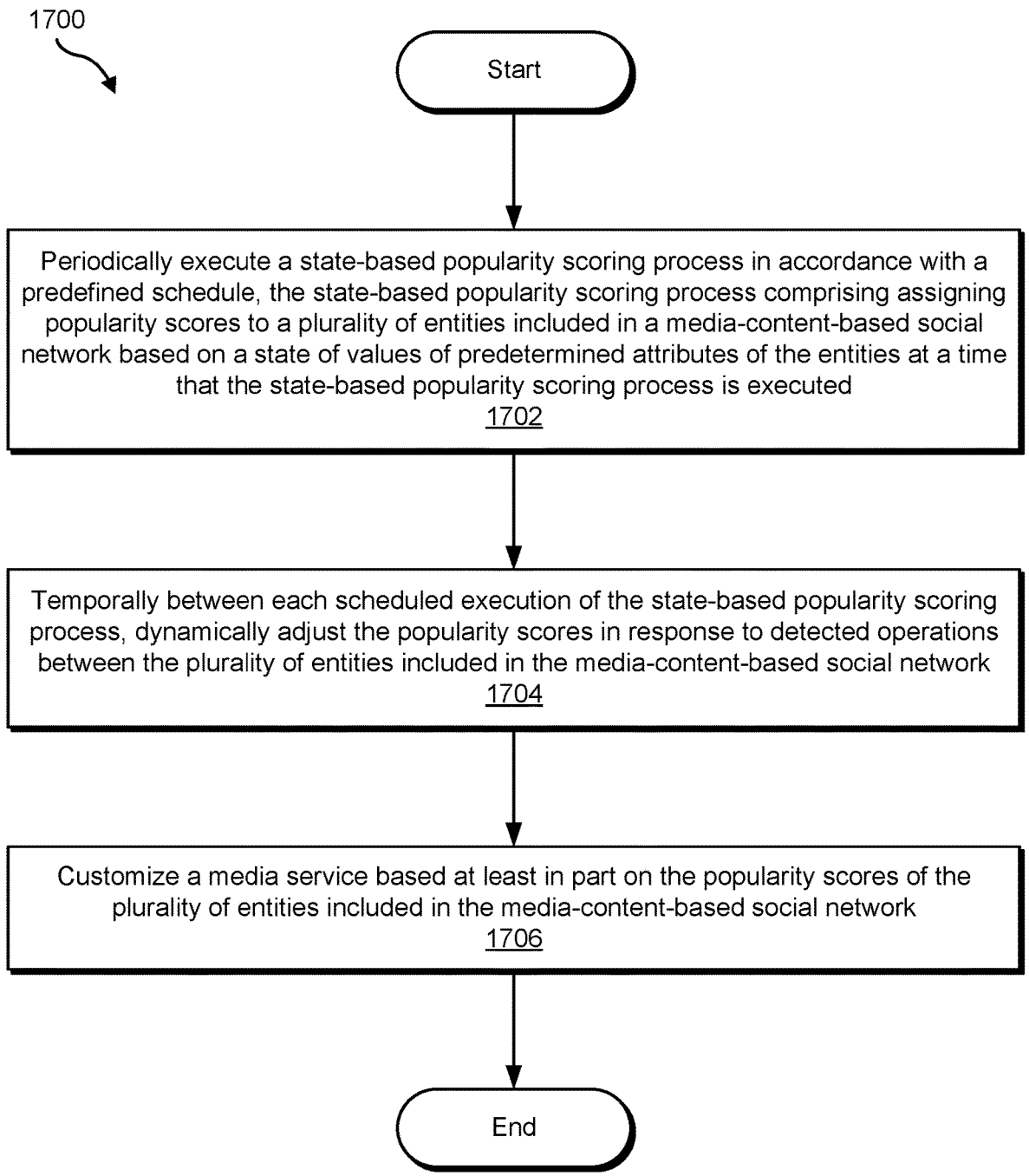

FIG. 17 illustrates an exemplary method for scoring and using popularity of entities in a media-content-based social network to provide a media service. While FIG. 17 illustrates exemplary operations according to one embodiment, other embodiments may omit, add to, reorder, and/or modify any of the operations shown in FIG. 17. One or more of the operations in FIG. 17 may be performed by system 200 and/or any implementation thereof.

In operation 1702, a media service system periodically executes a state-based popularity scoring process in accordance with a predefined schedule, the state-based popularity scoring process comprising assigning popularity scores to a plurality of entities included in a media-content-based social network based on a state of values of predetermined attributes of the entities at a time that the state-based popularity scoring process is executed. Operation 1702 may be performed in any of the ways described herein.

In operation 1704, the media service system, temporally between each scheduled execution of the state-based popularity scoring process, dynamically adjusts the popularity scores in response to detected operations between the plurality of entities included in the media-content-based social network. Operation 1704 may be performed in any of the ways described herein.

In operation 1706, the media service system customizes a media service based at least in part on the popularity scores of the plurality of entities included in the media-content-based social network. Operation 1706 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 18:
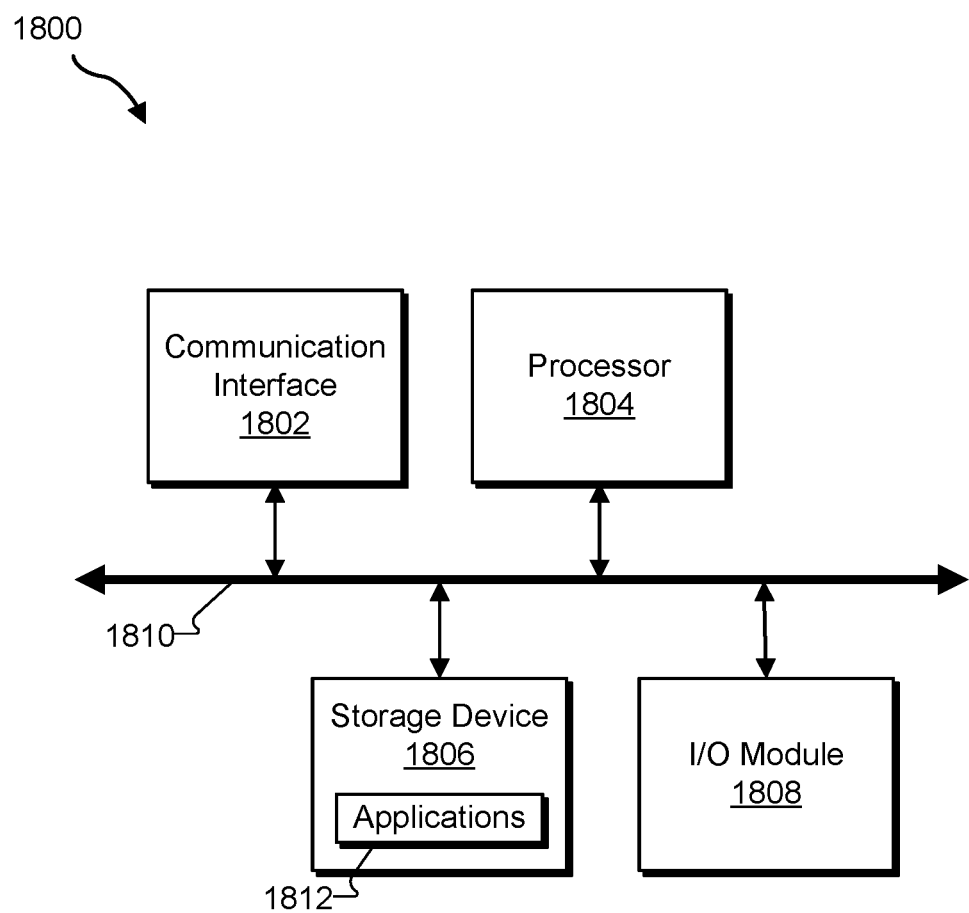
FIG. 18 illustrates an exemplary computing device according to principles described herein.

FIG. 18 illustrates an exemplary computing device 1800 that may be specifically configured to perform one or more of the processes described herein. As shown in FIG. 18, computing device 1800 may include a communication interface 1802, a processor 1804, a storage device 1806, and an input/output ("I/O") module 1808 communicatively connected via a communication infrastructure 1810. While an exemplary computing device 1800 is shown in FIG. 18, the components illustrated in FIG. 18 are not intended to be limiting. Additional or alternative components may be used in other embodiments. Components of computing device 1800 shown in FIG. 18 will now be described in additional detail.

Communication interface 1802 may be configured to communicate with one or more computing devices. Examples of communication interface 1802 include, without limitation, a wired network interface (such as a network interface card), a wireless network interface (such as a wireless network interface card), a modem, an audio/video connection, and any other suitable interface.

Processor 1804 generally represents any type or form of processing unit capable of processing data or interpreting, executing, and/or directing execution of one or more of the instructions, processes, and/or operations described herein. Processor 1804 may direct execution of operations in accordance with one or more applications 1812 or other computer-executable instructions such as may be stored in storage device 1806 or another computer-readable medium.

Storage device 1806 may include one or more data storage media, devices, or configurations and may employ any type, form, and combination of data storage media and/or device. For example, storage device 1806 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1806. For example, data representative of one or more executable applications 1812 configured to direct processor 1804 to perform any of the operations described herein may be stored within storage device 1806. In some examples, data may be arranged in one or more databases residing within storage device 1806.

I/O module 1808 may be configured to receive user input and provide user output and may include any hardware, firmware, software, or combination thereof supportive of input and output capabilities. For example, I/O module 1808 may include hardware and/or software for capturing user input, including, but not limited to, a keyboard or keypad, a touchscreen component (e.g., touchscreen display), a receiver (e.g., an RF or infrared receiver), and/or one or more input buttons.

I/O module 1808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1808 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1800. For example, one or more applications 1812 residing within storage device 1806 may be configured to direct processor 1804 to perform one or more processes or functions associated with media service customization facility 202 and/or entity scoring facility 204. Likewise, storage facility 206 may be implemented by or within storage device 1806.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. As another example, while certain examples have been described in relation to scoring and using popularity of entities in a media-content-based social network, one or more of the principles described herein may be applied to other types of social networks, such as a social network that is not based on media content (e.g., a social network that does not include entities representing media content distributed as part of a media service). The description and drawings are accordingly to be regarded in an illustrative rather than a restrictive sense.

What is claimed is:

1. A method comprising:
   periodically executing, by a media service system, a state-based popularity scoring process in accordance with a predefined schedule, the state-based popularity scoring process comprising assigning popularity scores to a plurality of entities included in a media-content-based social network based on a state of values of predetermined attributes of the entities at a time that the state-based popularity scoring process is executed;
   temporally between each scheduled execution of the state-based popularity scoring process, dynamically adjusting, by the media service system, the popularity scores in response to detected operations between the plurality of entities included in the media-content-based social network, the dynamically adjusting the popularity scores comprising
   detecting, by the media service system, an operation in the media-content-based social network, the operation directed from a first entity to a second entity included in the media-content-based social network, and
   adjusting, by the media service system, in response to the detecting of the operation in the media-content-based social network, the popularity score of the second entity by an amount proportional to the popularity score of the first entity at a time of the operation; and
   customizing, by the media service system, a media service based at least in part on the popularity scores of the plurality of entities included in the media-content-based social network.

2. The method of claim 1, wherein the predetermined attributes of the entities comprise:
   a preassigned popularity score of each of the plurality of entities;
   an influence factor of each of the plurality of entities corresponding to a number of followers of each of the plurality of entities at the time that the state-based popularity scoring process is executed;
   an activity factor of each of the plurality of entities, the activity factor based on
   a cardinality of a set of operations involving each of the plurality of entities over a period of time since an execution of the state-based popularity scoring process immediately previous to the executing of the state-based popularity scoring process, and an age associated with each of the set of operations involving each of the plurality of entities over the period of time; and a reach factor of each of the plurality of entities, the reach factor based on the cardinality of the set of operations involving each of the plurality of entities over the period of time and the number of followers of each of the plurality of entities.

3. The method of claim 1, embodied as computer-executable instructions on at least one non-transitory computer-readable medium.

4. The method of claim 1, wherein the dynamically adjusting the popularity scores further comprises:

adjusting, in response to the detecting of the operation in the media-content-based social network, the popularity score of the first entity by the amount proportionate to the first popularity score of the first entity at the time of the operation.

5. A system comprising:

at least one physical computing device that assigns popularity scores to a plurality of entities that represent a plurality of entities in a media-content-based social network, the popularity scores including a first popularity score assigned to a first entity included in the plurality of entities and a second popularity score assigned to a second entity included in the plurality of entities;

detects an operation in the media-content-based social network, the operation directed from the first entity to the second entity;

adjusts, in response to the detection of the operation in the media-content-based social network, the second popularity score of the second entity by an amount proportional to the first popularity score of the first entity at a time of the operation; and customizes a media service based at least in part on the popularity scores of the plurality of entities included in the media-content-based social network.

6. The system of claim 5, wherein the at least one physical computing device further adjusts, in response to the detection of the operation in the media-content-based social network, the first popularity score of the first entity by a second amount proportional to the first popularity score of the first entity at the time of the operation.

7. The system of claim 6, wherein the at least one physical computing device:

adjusts the second popularity score of the second entity by adding the amount proportional to the first popularity score of the first entity at the time of the operation to the second popularity score of the second entity; and adjusts the first popularity score of the first entity by subtracting the second amount proportional to the first popularity score of the first entity at the time of the operation from the first popularity score of the first entity.

8. The system of claim 5, wherein the at least one physical computing device further:

determines a number of stakeholders of the second entity; and adjusts, in response to the adjustment of the second popularity score of the second entity, a third popularity score assigned to a third entity included in the plurality of entities by an amount proportionate to the amount of the adjustment of the second popularity value of the second entity divided by the determined number of stakeholders of the second entity.

9. The system of claim 5, wherein the at least one physical computing device assigns the first popularity score to the first entity by:

determining a preassigned popularity score of the first entity, a number of followers of the first entity, and a set of operations involving the first entity over a predetermined amount of time;

calculating a static popularity score of the first entity based on one or more of:

the preassigned popularity score of the first entity, an influence factor corresponding to the number of followers of the first entity, an activity factor based on a cardinality of the set of operations involving the first entity over the predetermined amount of time and an age associated with each of the set of operations involving the first entity over the predetermined amount of time, and a reach factor based on the cardinality of the set of operations involving the first entity over the predetermined amount of time and the number of followers of the first entity; and assigning the calculated static popularity score as the popularity score of the first entity.

10. A method comprising:

assigning, by a media service system, popularity scores to a plurality of entities included in a media-content-based social network, the popularity scores including a first popularity score assigned to a first entity included in the plurality of entities and a second popularity score assigned to a second entity included in the plurality of entities;

detecting, by the media service system, an operation in the media-content-based social network;

adjusting, by the media service system, in response to the detecting of the operation in the media-content-based social network, the second popularity score of the second entity by an amount proportional to the first popularity score of the first entity at a time of the operation; and customizing, by the media service system, a media service based at least in part on the popularity scores of the plurality of entities included in the media-content-based social network.

11. The method of claim 10, wherein:

the operation is directed from the first entity to the second entity included in the media-content-based social network;

the adjusting the second popularity score of the second entity comprises adding the amount proportional to the first popularity score of the first entity at the time of the operation to the second popularity score of the second entity; and the method further comprises adjusting, in response to the detecting of the operation in the media-content-based social network, the first popularity score of the first entity by a second amount proportional to the first popularity score of the first entity at the time of the operation by subtracting the second amount proportional to the first popularity score of the first entity at the time of the operation from the first popularity score of the first entity.

12. The method of claim 10, wherein the adjusting the second popularity score of the second entity comprises one of:

adding the amount proportional to the first popularity score of the first entity at the time of the operation to the second popularity score of the second entity; and subtracting the amount proportional to the first popularity score of the first entity at the time of the operation from the second popularity score of the second entity.

13. The method of claim 10, further comprising adjusting, in response to the detecting of the operation in the media-content-based social network, the first popularity score of the first entity by a second amount proportional to the first popularity score of the first entity at the time of the operation.

14. The method of claim 13, wherein the adjusting the first popularity score of the first entity comprises one of:
adding the second amount proportional to the first popularity score of the first entity at the time of the operation to the first popularity score of the first entity; and
subtracting the second amount proportional to the first popularity score of the first entity at the time of the operation from the first popularity score of the first entity.

15. The method of claim 10, further comprising:
adjusting, by the media service system, a third popularity score assigned to a third entity included in the plurality of entities by an amount proportionate to an amount of change to the second popularity score of the second entity divided by a number of stakeholders in the second entity.

16. The method of claim 10, wherein the assigning of the first popularity score to the first entity comprises assigning a predetermined starting popularity score to the first entity in response to the first entity being added to the media-content-based social network.

17. The method of claim 10, wherein the assigning of the first popularity score to the first entity comprises:
determining a previous popularity score of the first entity, a number of followers of the first entity, and a set of operations involving the first entity over a predetermined amount of time;
determining a state-based popularity score of the first entity based on one or more of:
the previous popularity score of the first entity,
an influence factor corresponding to the number of followers of the first entity,
an activity factor based on a cardinality of the set of operations involving the first entity over the predetermined amount of time and an age associated with each operation in the set of operations involving the first entity over the predetermined amount of time, and
a reach factor based on the cardinality of the set of operations involving the first entity over the predetermined amount of time and on the number of followers of the first entity; and
assigning the state-based popularity score as the popularity score of the first entity.

18. The method of claim 10, wherein the assigning of the popularity score to the first entity in the media-content-based social network comprises:
detecting that a time-to-live value of the first entity has expired;
determining, in response to the detecting that the time-to-live value of the first entity has expired, a new popularity score for the first entity in accordance with a decay function; and
assigning the new popularity score as the first popularity score of the first entity.

19. The method of claim 10, wherein the operation is directed from the first entity to the second entity included in the media-content-based social network.

20. The method of claim 10, embodied as computer-executable instructions on at least one non-transitory computer-readable medium.

* * * * *